March 17, 1942.  R. P. DELANO, JR  2,276,290
VALVE MOTION MECHANISM FOR FLUID PRESSURE ENGINES
Filed July 15, 1940  16 Sheets-Sheet 10
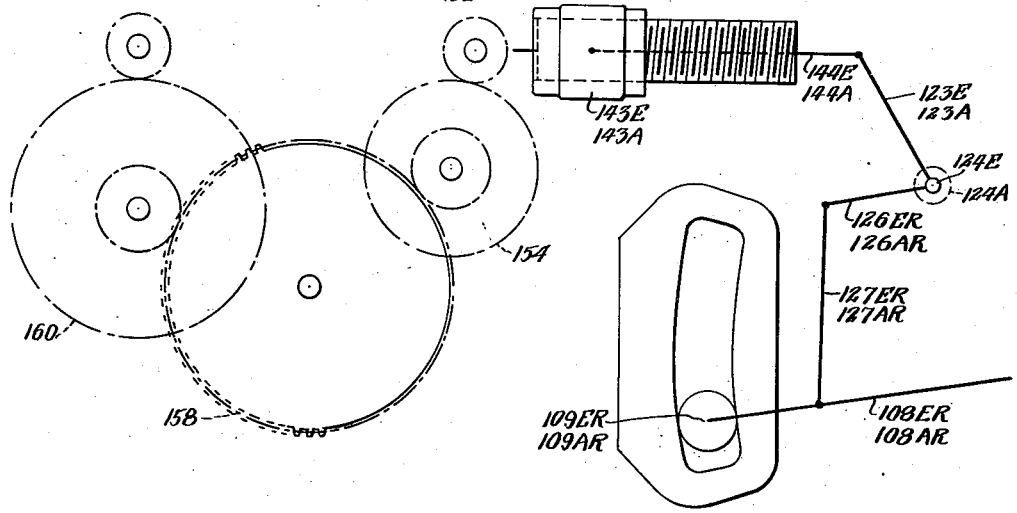
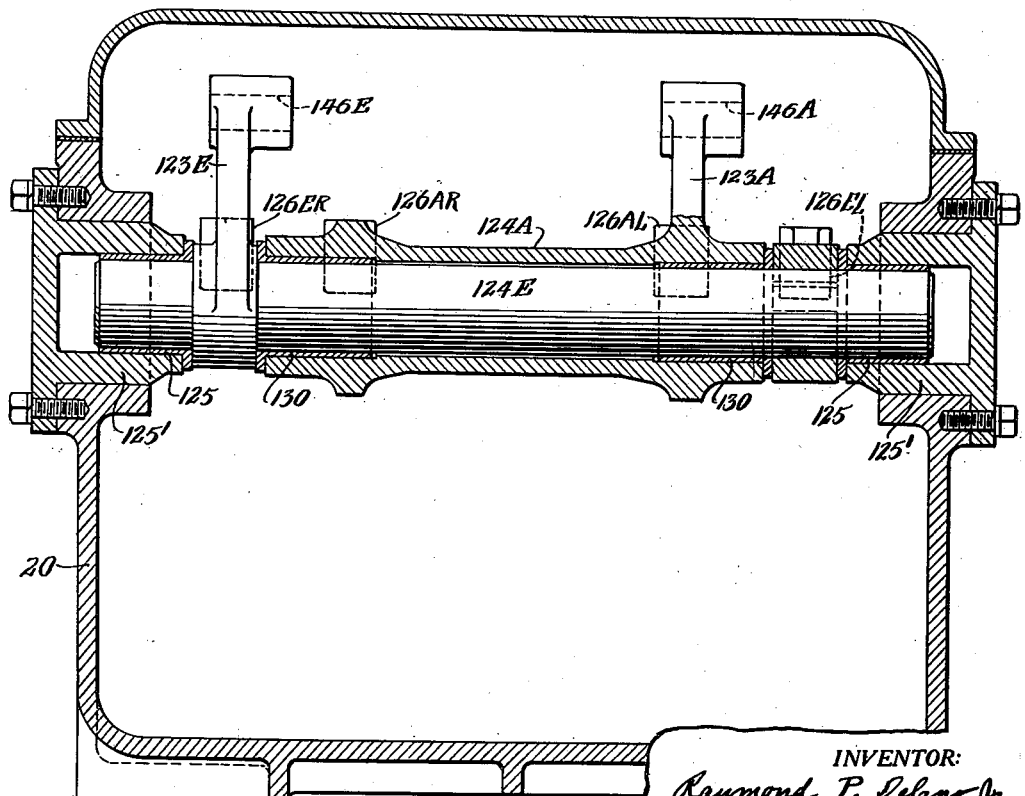
INVENTOR:
Raymond P. Delano Jr.
BY
Synnestvedt + Lechner
ATTORNEYS.

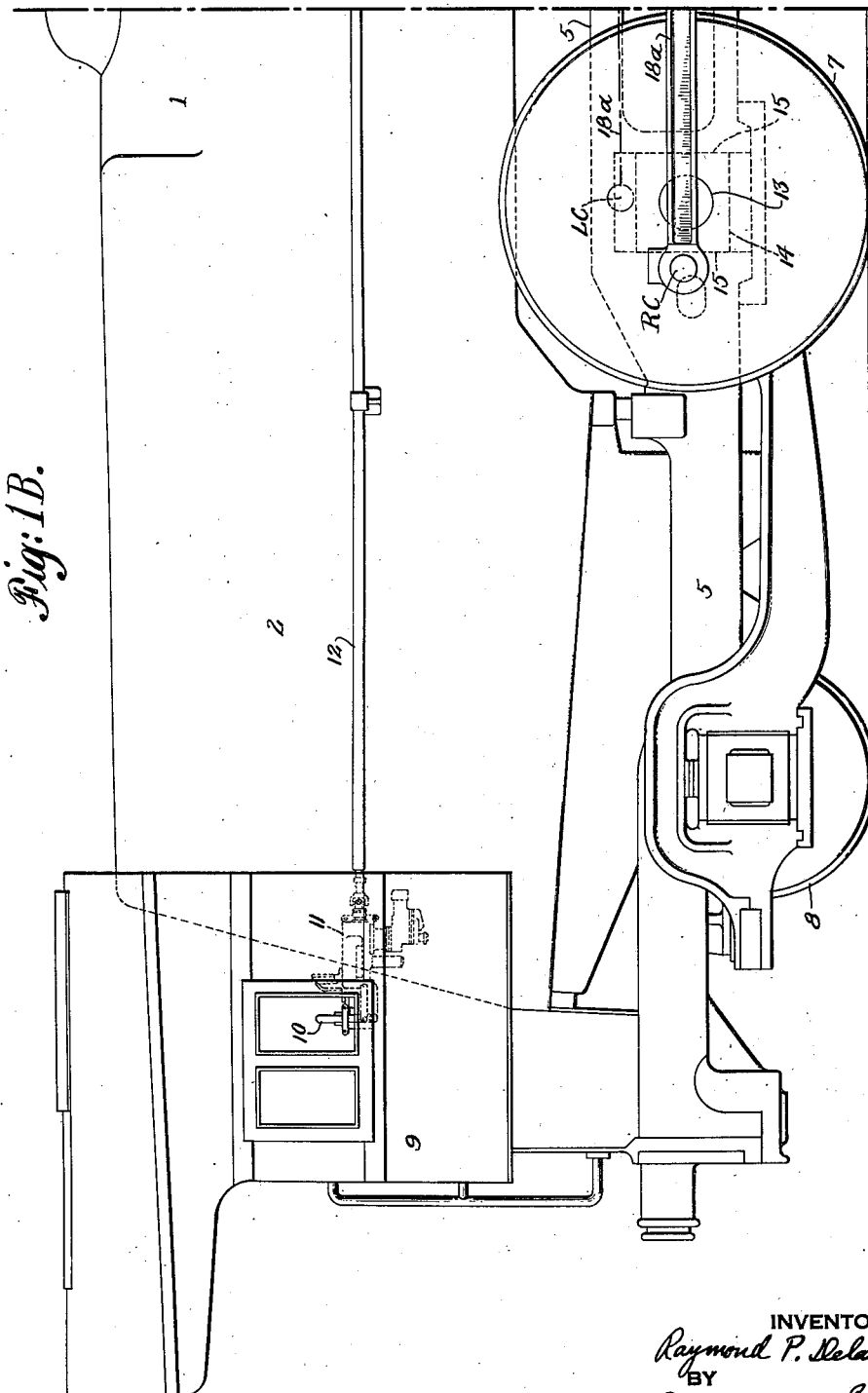

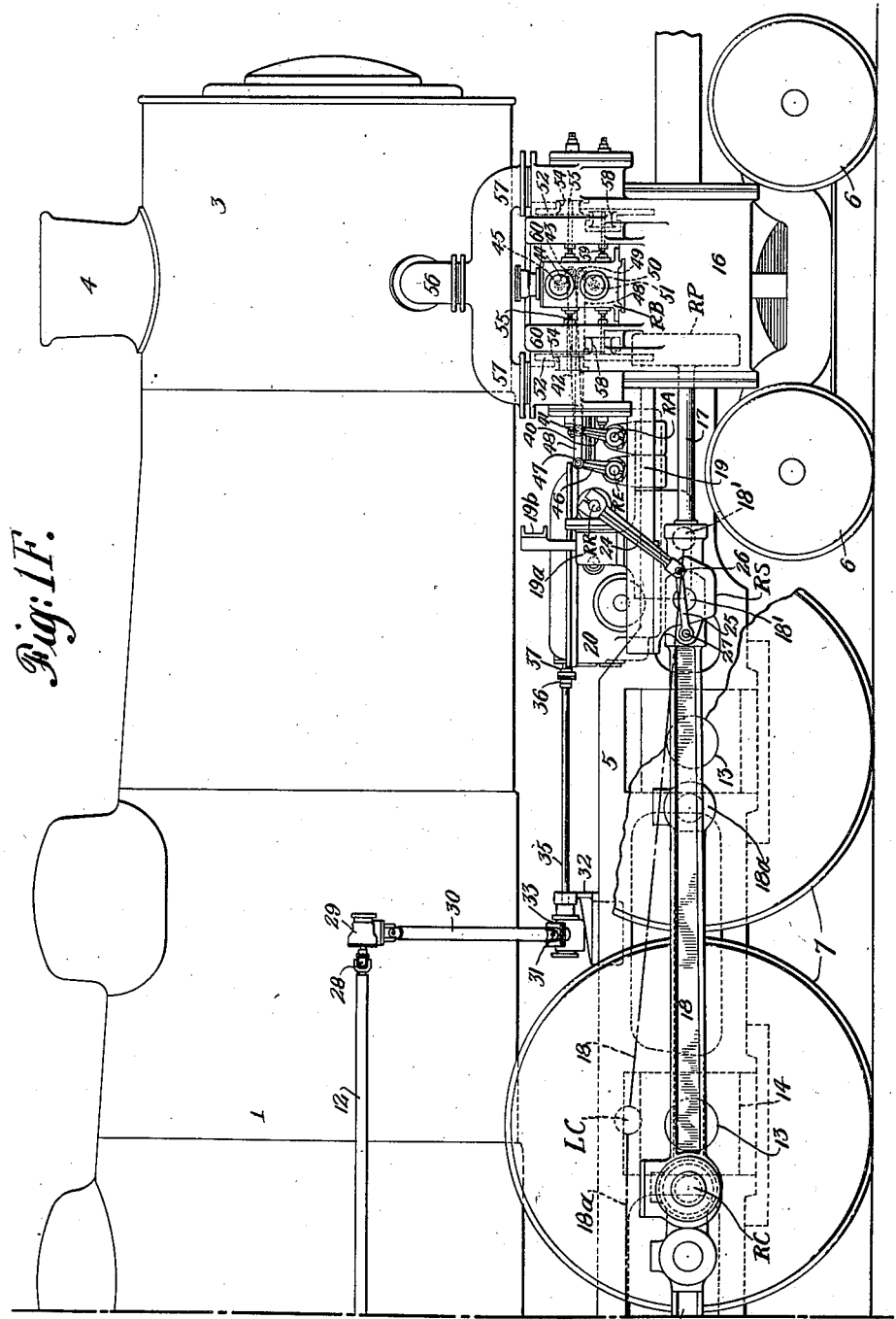

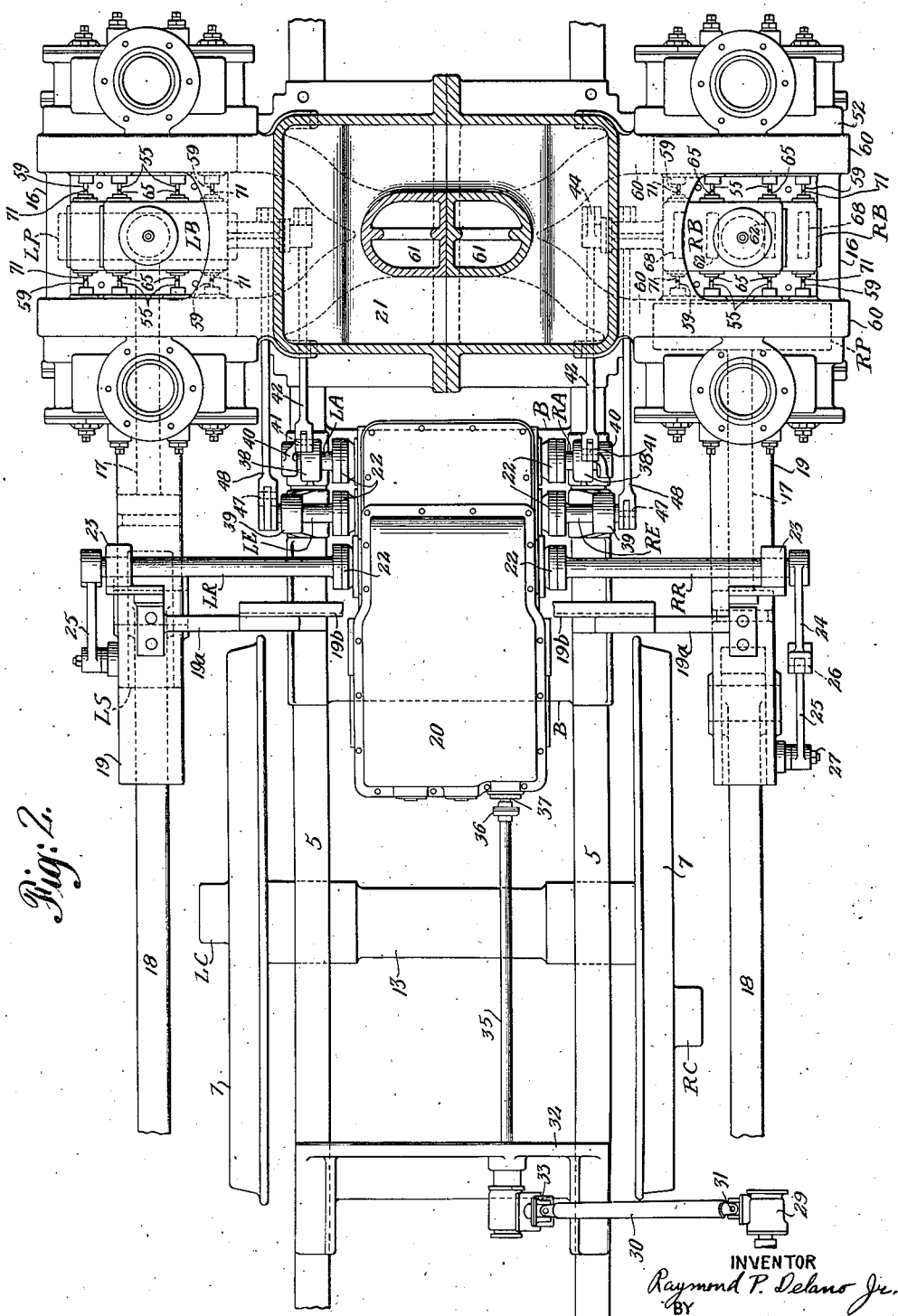

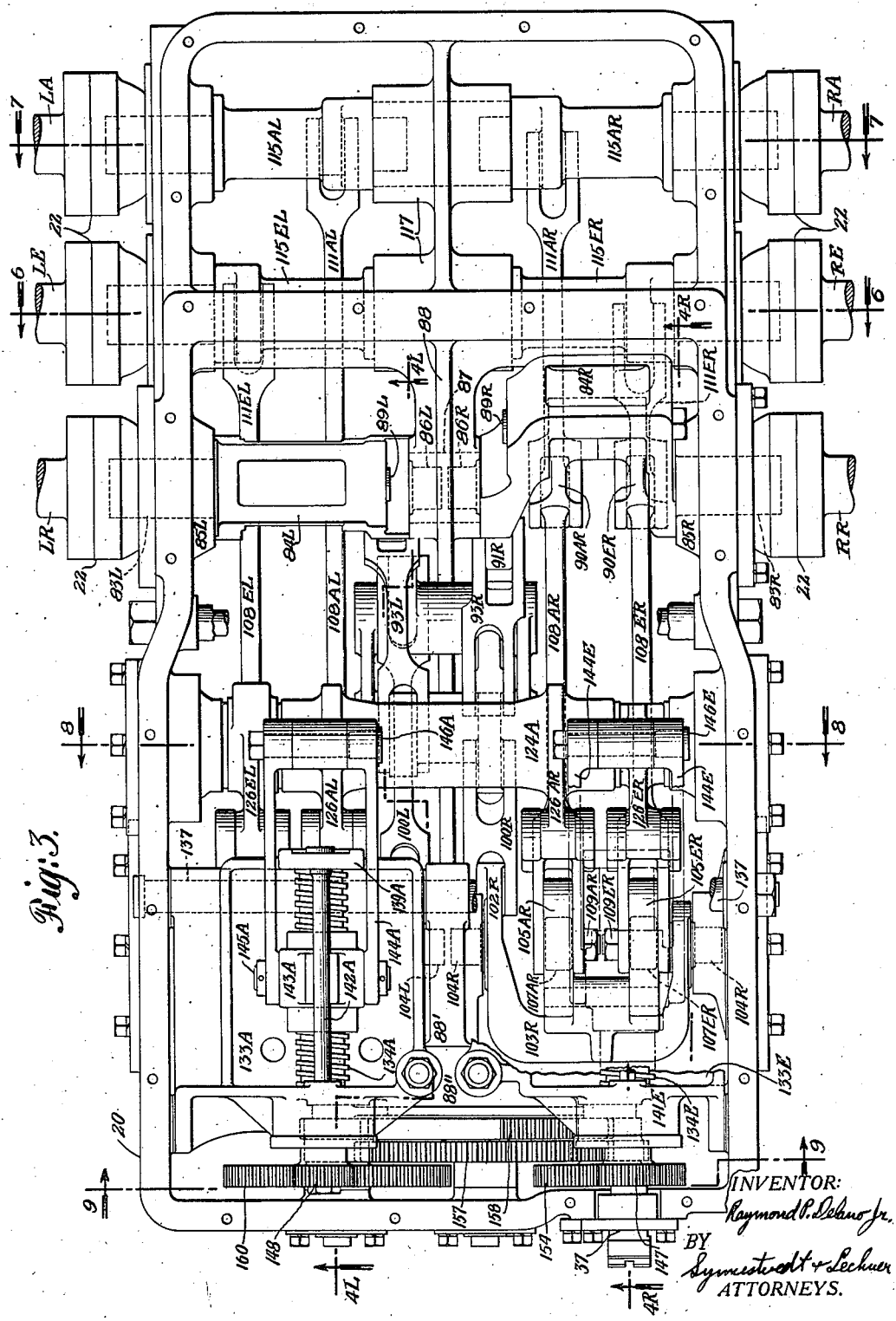

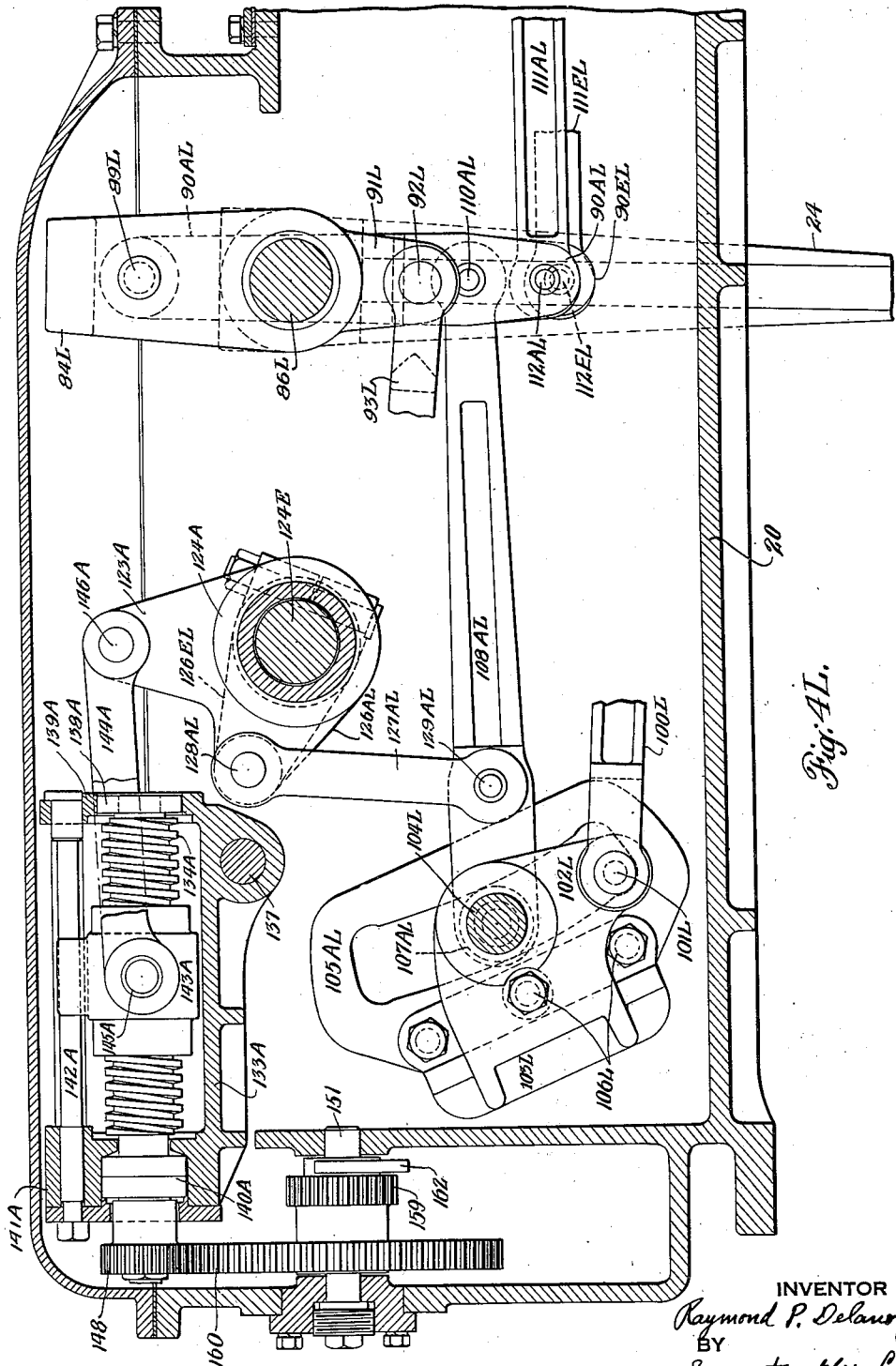

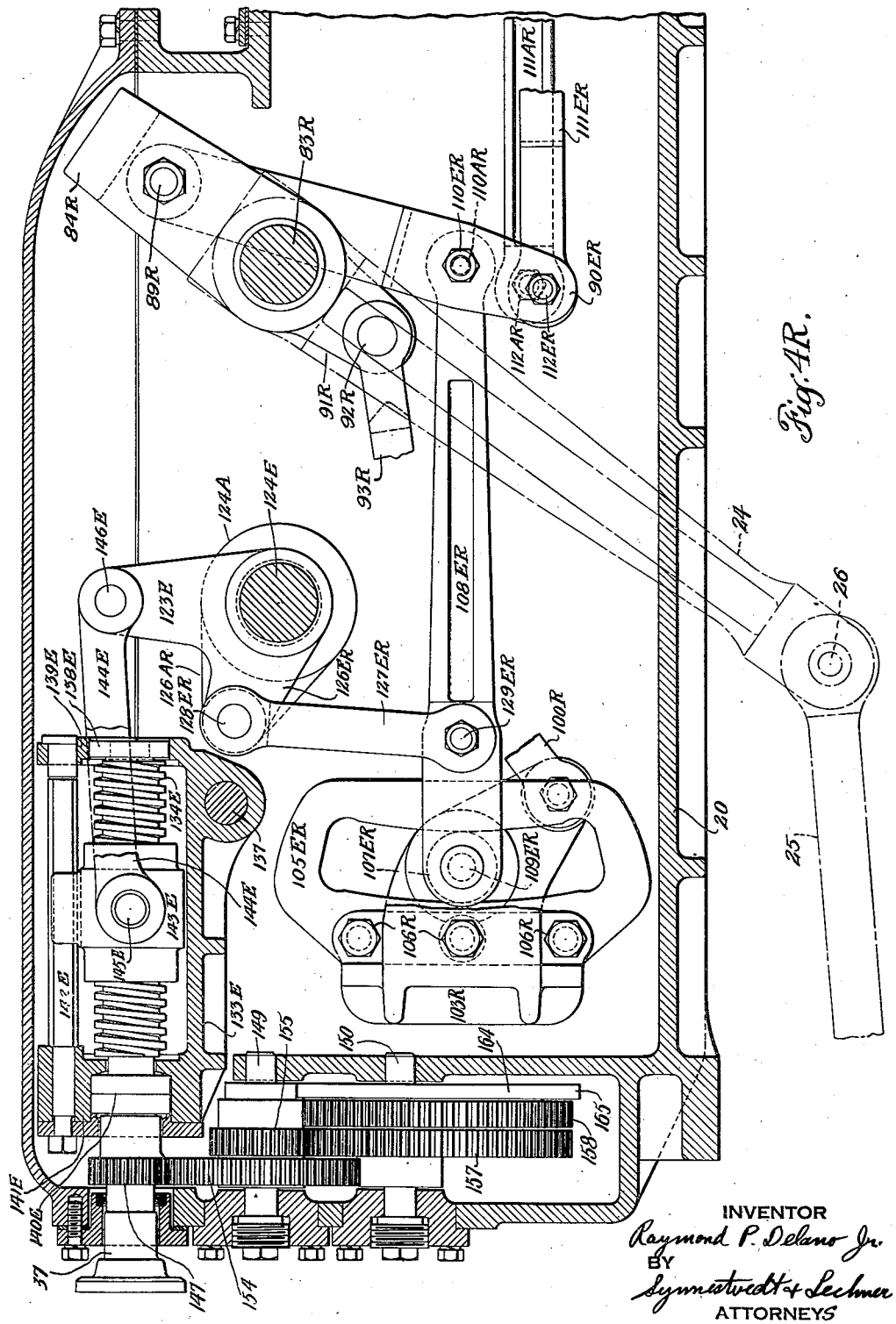

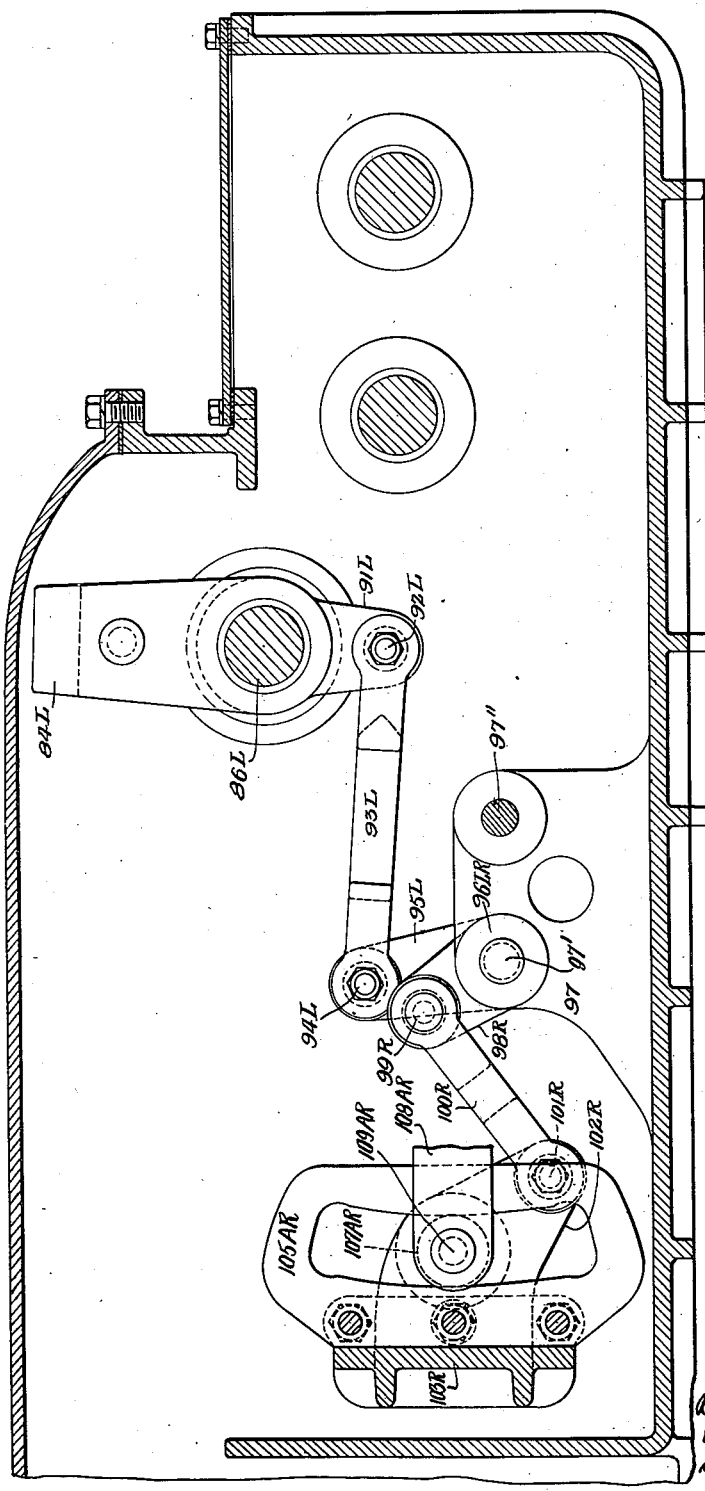

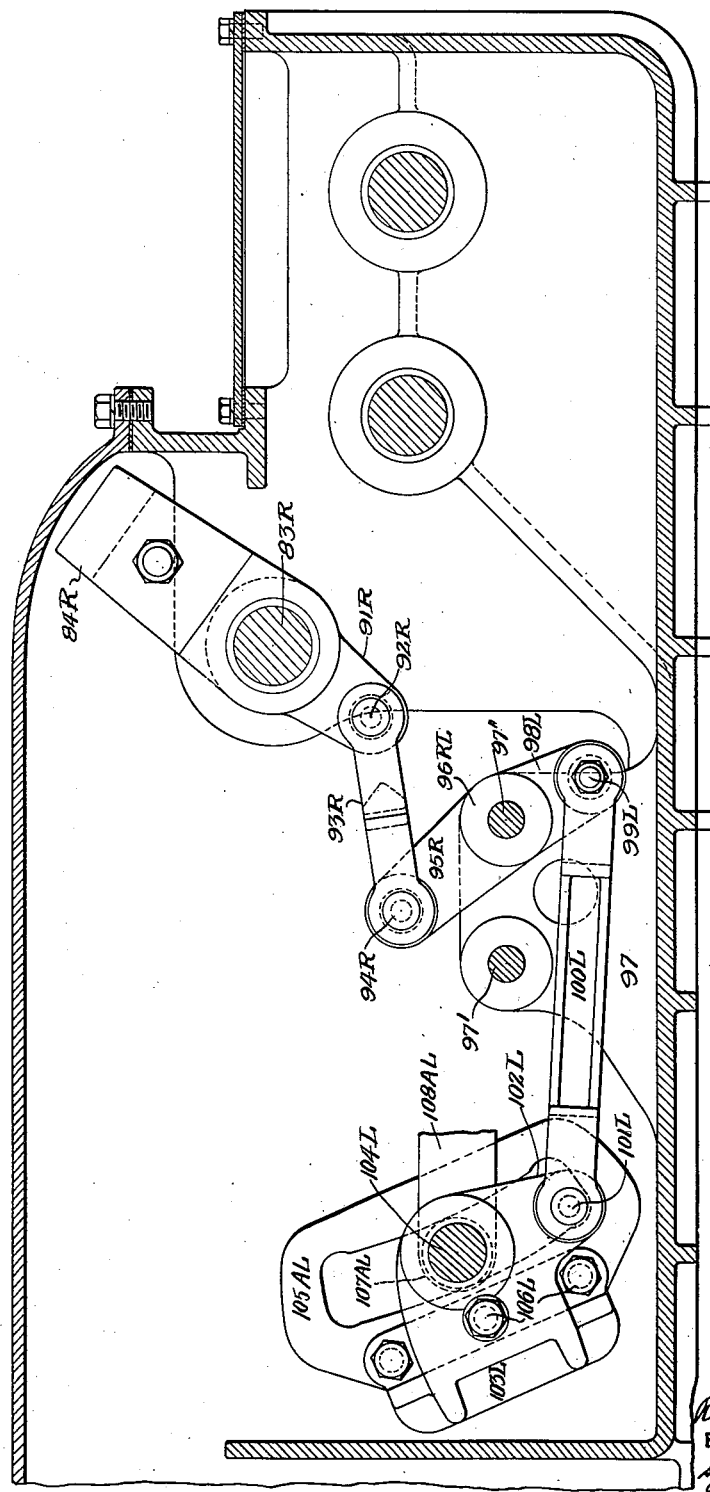

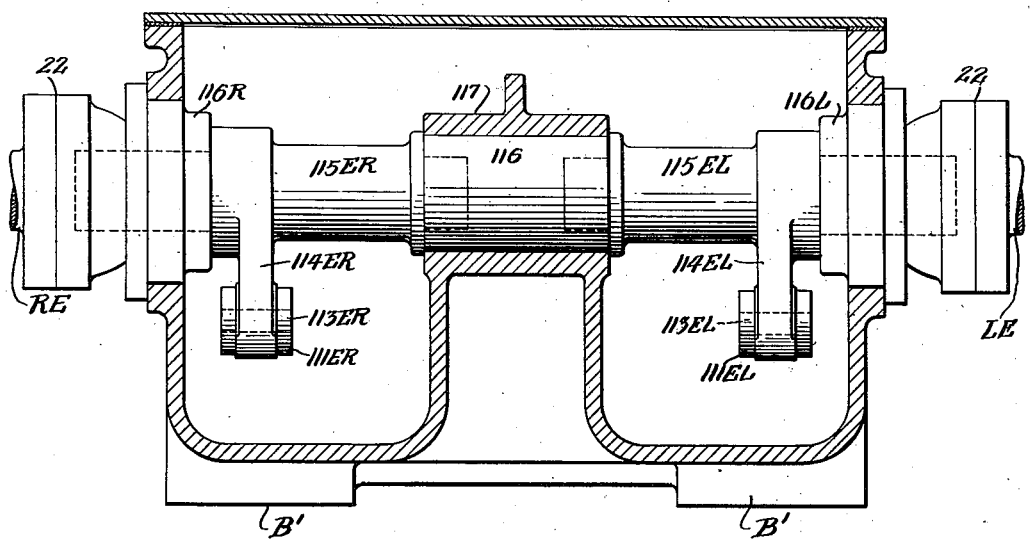
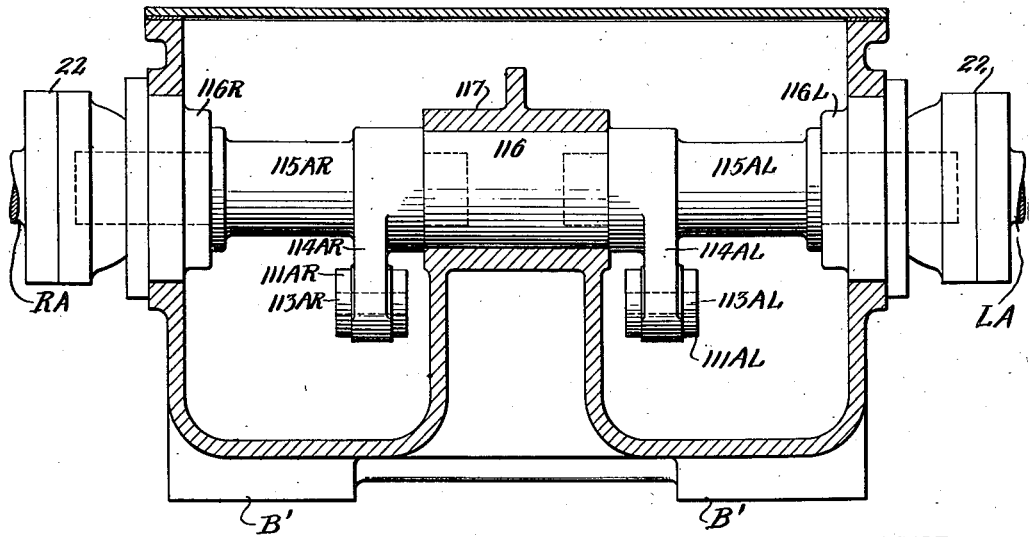

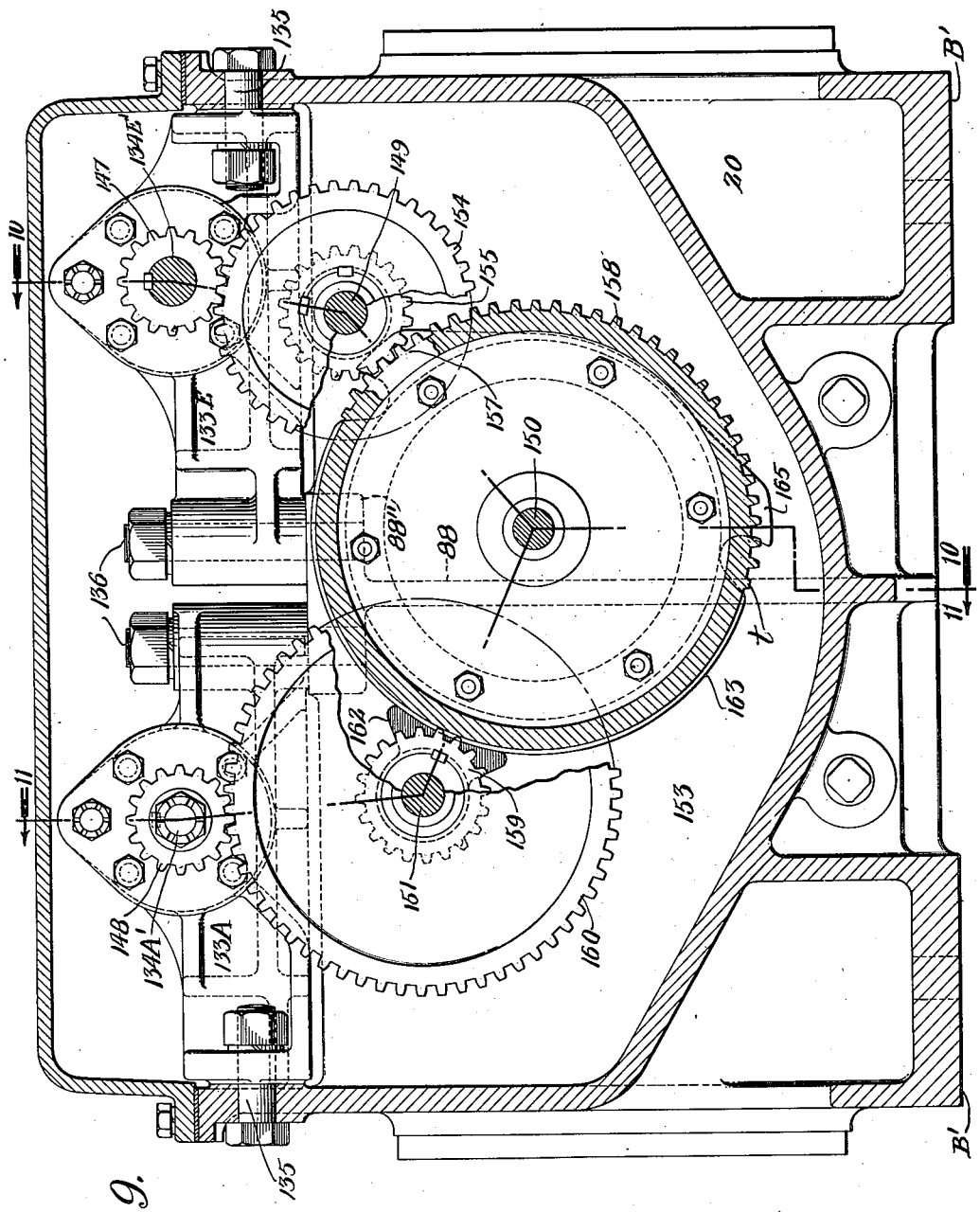

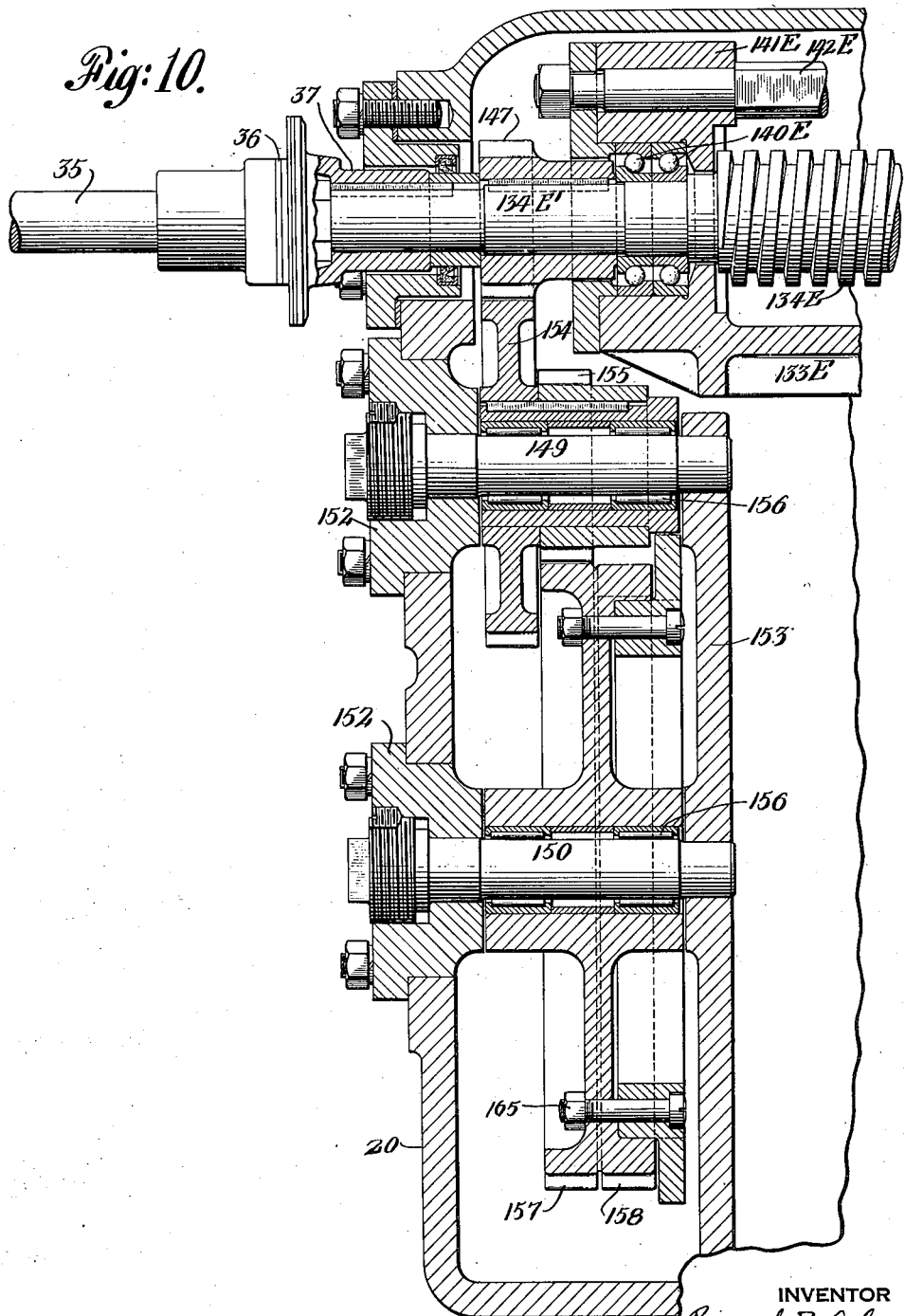

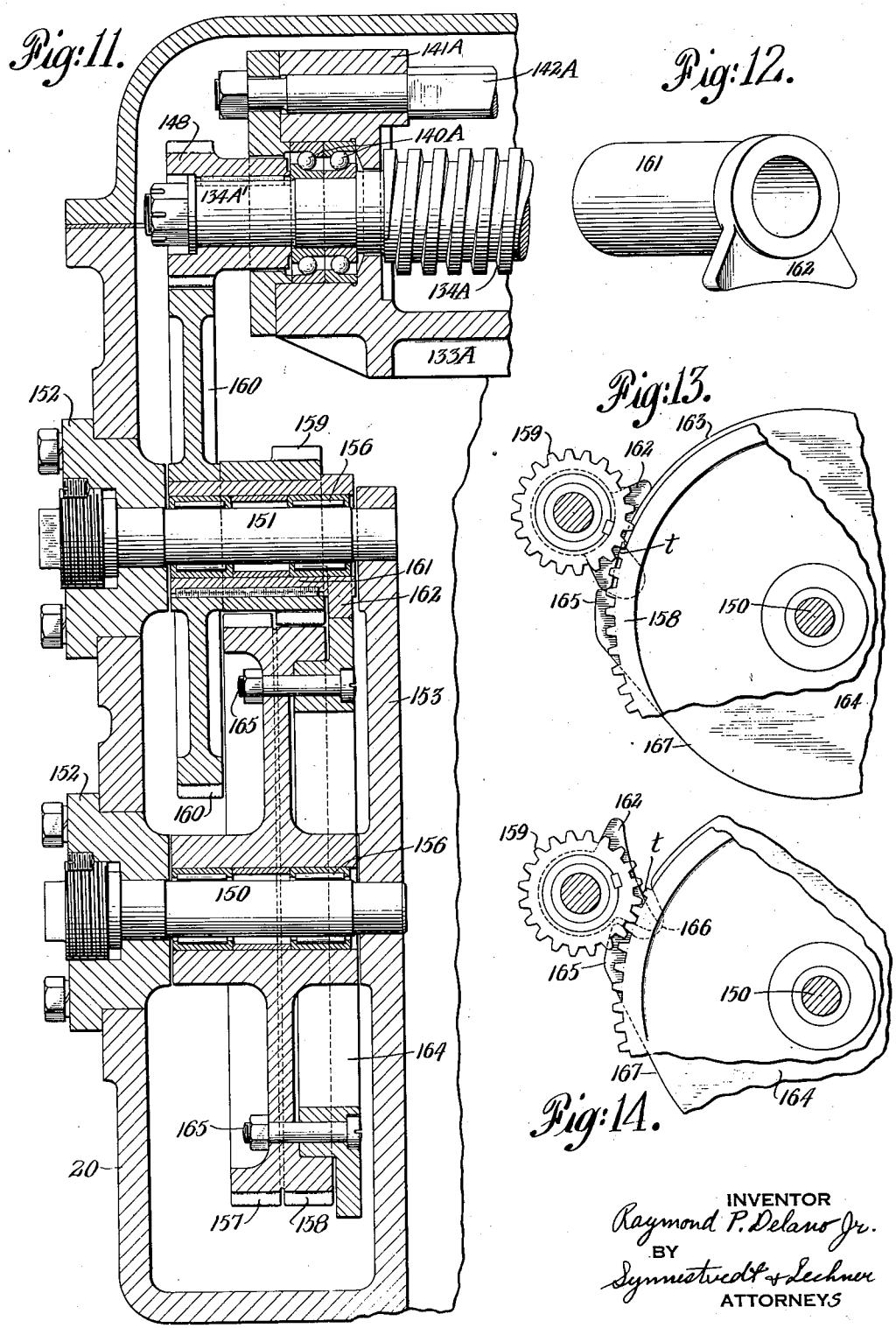

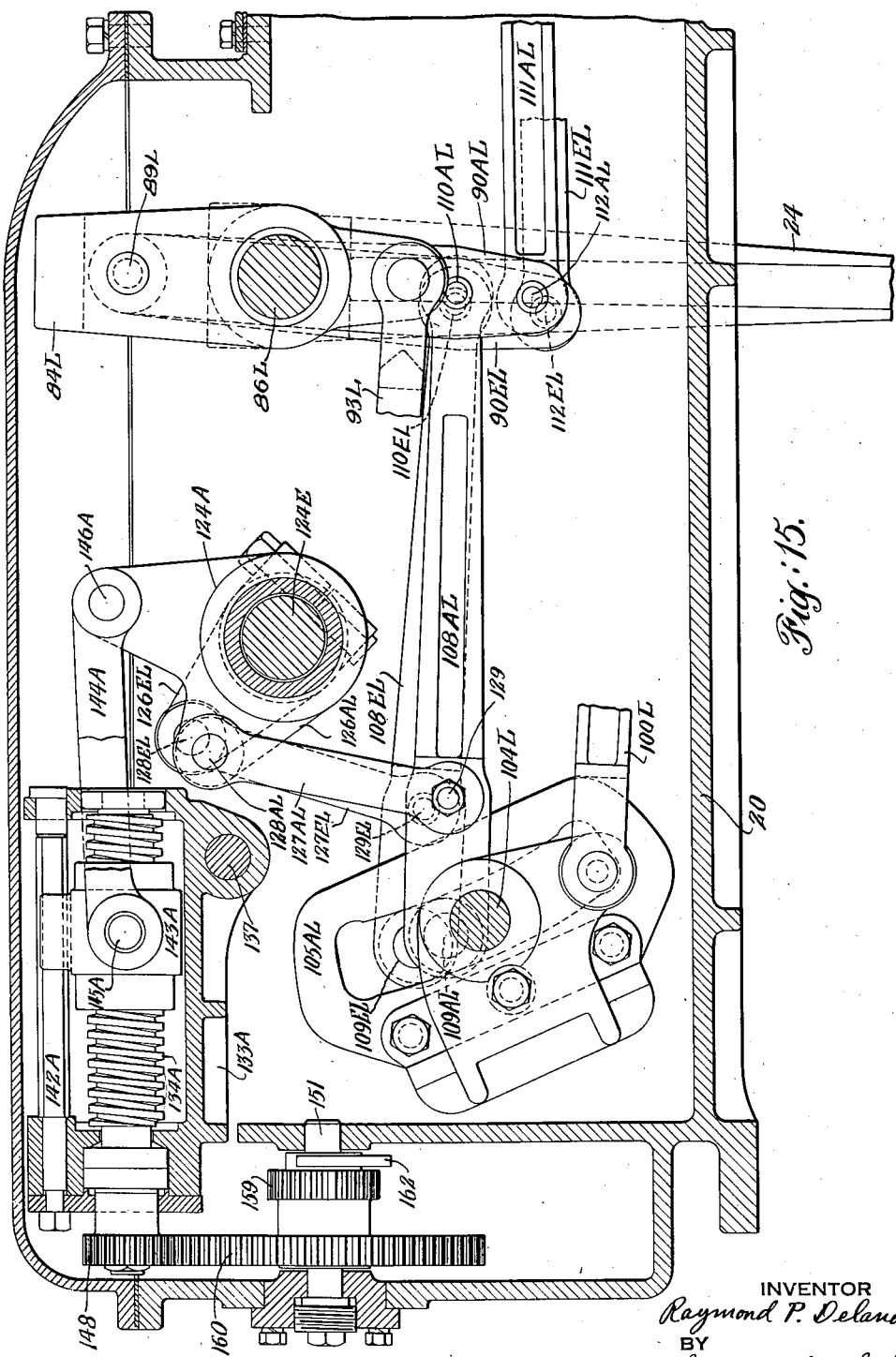

FULL-GEAR FORWARD

FORWARD MID-GEAR

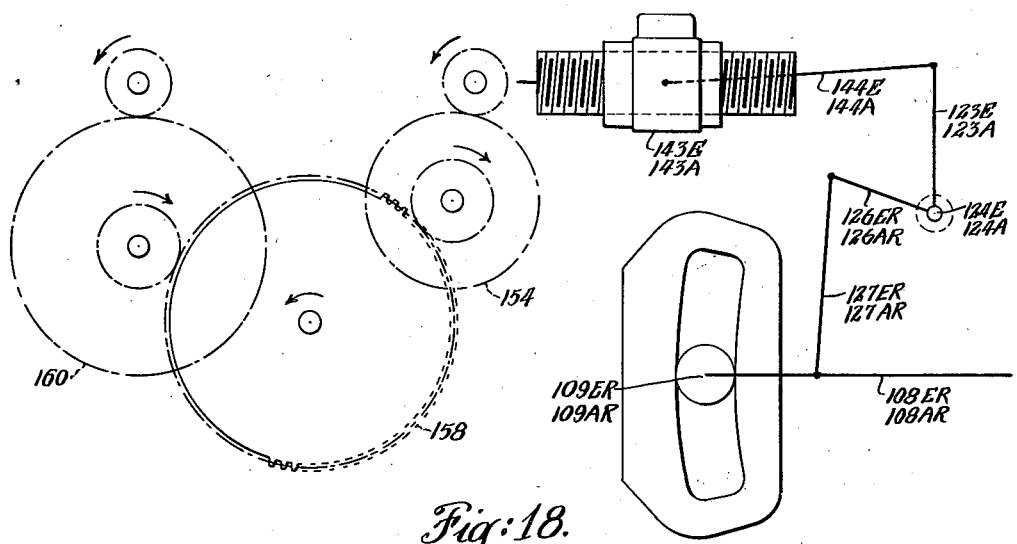
Fig: 18.
NEUTRAL POSITION
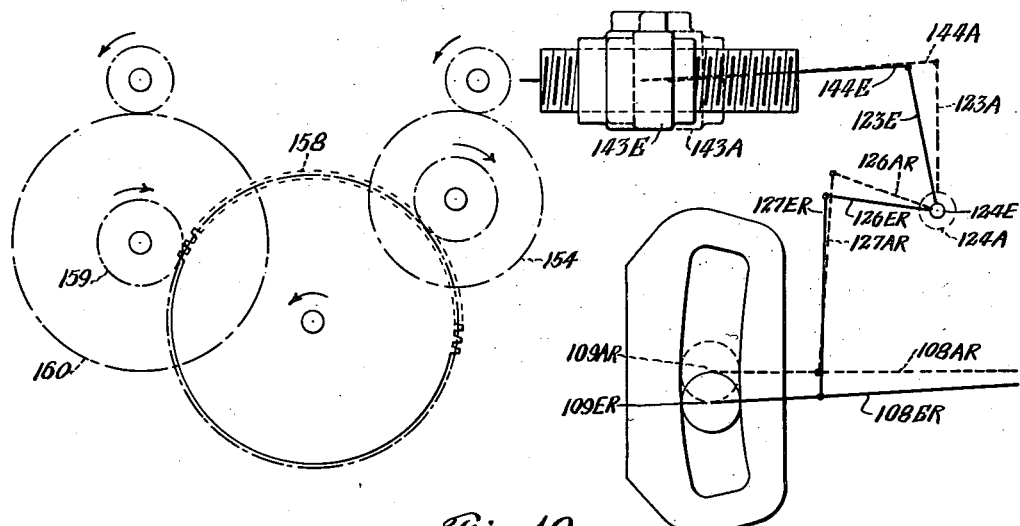
Fig: 19.
REVERSE MID-GEAR
INVENTOR:
Raymond P. Delano Jr.
BY
Synnestvedt + Lechner
ATTORNEYS.

Patented Mar. 17, 1942

2,276,290

UNITED STATES PATENT OFFICE 2,276,290

VALVE MOTION MECHANISM FOR FLUID PRESSURE ENGINES

Raymond P. Delano, Jr., Catonsville, Md., assignor to The Balmar Corporation, Baltimore, Md., a corporation of Maryland Application July 15, 1940, Serial No. 345,479

30 Claims. (Cl. 121—116)

Field of the invention

This invention relates to valve motion mechanism for fluid pressure engines, and more particularly to adjustable and reversible valve gear for actuating and controlling the valve means of locomotive engines equipped with relatively movable admission and exhaust valves.

Although, in its broad aspects, the present invention is applicable to various types of engines having any type or form of valves (provided that the admission valve means and the exhaust valve means are arranged to be capable of the requisite independence of operation), the invention is especially useful in and adaptable to steam locomotive engines of the double-acting reciprocating type having separate poppet valves for steam admission and exhaust.

Likewise, although the essentials of the invention are broadly applicable to valve gears of various known types, deriving their motion from one or from a plurality of moving parts of the running gear, and utilizing any of various known devices for adjustment and reversal, the invention is especially useful in and adaptable to valve gears actuated from two reciprocating parts of the engine, particularly the two crossheads of a two-cylinder engine, wherein the two actuating motions are combined in a ratio which is progressively variable as by means of an adjustable link and link-block mechanism.

The invention will, therefore, be illustrated and described herein as applied in the particular field above defined.

Objects and advantages

One of the primary purposes of the invention is to secure a coordinated progressive adjustment of the timing of the admission valve events (admission and cut-off) on the one hand, and the exhaust valve events (release and compression) on the other hand, in an improved manner, and by a novel mechanism which is simple, rugged, accurate, reliable, compact, readily adjustable, flexibly adapted to different installations, and relatively inexpensive as to manufacture and maintenance.

Fundamentally, it is known that by the employment of relatively movable admission and exhaust valve means, e. g., separate or independent admission and exhaust poppet valves for each cylinder, which are independently actuated, it is possible to secure improvements in the timing of the four valve events, throughout a predetermined range of adjustment, as compared with engines wherein all the valve events are effected by means of a single valve for each cylinder. Such improved timing is, for example, secured by the mechanisms disclosed and claimed in the co-pending applications of William E. Woodard, Serial No. 217,360, filed July 5, 1938 (Patent 2,234,614), and Serial No. 256,874, filed February 17, 1939 (Patent 2,234,613), wherein the adjustment of the timing of the exhaust valves is independently determined in any desired relation to the adjustment of the timing of the admission valves, the two adjustments being effected simultaneously from a common control through a coordinating mechanism.

In view of the above, it is a further object of the present invention to secure improvements in the timing of the valves equivalent to the improvements secured by the mechanisms of said Woodard applications, but through the intermediation of a new and improved coordinating mechanism.

More particularly, my invention contemplates, in conjunction with means for progressive timing adjustment of the admission valve events and means for independent progressive timing adjustment of the exhaust valve events, a coordinating mechanism adapted to effect adjustment movement of both said means simultaneously at different rates within a portion of the total range of valve gear adjustment and to effect a stoppage or "dwell" of one of said adjustment means at a predetermined point of said range while continuing the movement of the other of said means.

Still further, the invention contemplates a coordinating mechanism, of the character specified, adapted to effect a more rapid movement of the adjustment means for the admission valve events than of the corresponding adjustment means for the exhaust valve events, when adjusting the valve gear from a full-gear position toward a mid-gear position, and automatically to effect a dwell of the admission adjustment means at a predetermined position in its range of adjustment, and more particularly at or adjacent a neutral or mid-position.

The invention further contemplates such a coordinating mechanism adapted to effect a dwell of the admission adjustment means at the neutral position, while effecting a continuance of the movement of the exhaust adjusting means over an intermediate portion of the total range of adjustment, when the valve gear is being shifted either from the forward range into the reverse range or vice versa.

More specifically, the invention contemplates a coordinating mechanism of the character referred to, wherein, although the admission and exhaust are differently adjusted, and the admission adjustment has an intermediate position of dwell, each adjustment means throughout its range of adjustment is moved in predetermined ratio to the movement of the common controlling organ, such as the engineman's reverse lever or wheel.

Still more specifically, the foregoing operations are secured by a coordinating mechanism which operates at all times through direct mechanical connections from the controlling organ to the admission and exhaust adjustment means; and particularly through the intermediation of gearing, which, for the actuation of the admission adjustment means, includes an intermittent or interrupted gear, adapted to cooperate, in the intermediate portion of the adjustment range, with shroud means which prevent the admission adjustment means from moving during said intermediate portion of the range.

Still further, the invention contemplates such gearing, wherein the shrouds are so positioned and the gear teeth so arranged that proper meshing of the teeth is assured and shock on the teeth is relieved during the transition from said intermediate portion of the range to the adjacent forward or reverse portions.

According to a further feature of the invention, the coordinating mechanism, having any or all of the characteristics hereinbefore mentioned, is constructed and arranged to be self-locking; i. e. in any position of adjustment of the admission and exhaust adjustment means, they are held in that position by the coordinating mechanism, unless positively moved by the engineman's control. Thus, forces and/or motions originating in the valve gear cannot materially disturb or alter the adjustment thereof nor can they be effectively transmitted back to the engineman's control or to the power reverse gear (when such is employed); whereas any adjustment of the engineman's control member is readily and positively effective upon the valve gear, through the intermediation of the coordinating mechanism.

Additionally, the invention contemplates housing of the coordinating mechanism commonly with the remainder of the valve gear in an enclosing box or casing; connection of the engineer's control to the valve gear, through said coordinating mechanism, by means of a rotatable shaft passing through a wall of said casing; coupling of the coordinating mechanism to the admission and exhaust adjustment means by separate connections which desirably include, as their final elements, screw or threaded members, which may be connected, respectively, to admission and exhaust reversing shaft arms by means of a traveling nut threaded on the screw; and various other features of construction and function as are disclosed in detail in the accompanying drawings and/or the description which follows.

*Brief description of drawings*

Figures 1B and 1F, showing the back and front ends, together constitute a somewhat diagrammatic side elevational view of a locomotive (minus tender), illustrating the application thereto of a valve gear employing the present preferred embodiment of my invention.

Figure 2 is a plan view, to a larger scale, of the forward portion of the locomotive chassis (taken in section through the saddle, and thus omitting the boiler, smoke-box, and other parts of the superstructure), showing in top plan the housing or casing, which encloses the valve gear inclusive of the coordinating mechanism of the present invention, and showing also the connections leading thereto from the crossheads and from the control in the cab as well as the connections leading from said casing to the cam boxes associated with the cylinders and valve chests.

Figure 3 is a plan section through the valve gear box or housing of Figure 2, to a larger scale, showing in top plan many of the internal working parts of the valve motion mechanism proper, and illustrating fragmentarily the rockshafts which are actuated by the crossheads and extend into the valve gear box to actuate the mechanism therein, and the actuated rockshafts which extend out of the gear box for connection to the linkages for driving the valve cam shafts, and illustrating also the main reverse-shaft connection to the coordinating mechanism, and the admission and exhaust reversing screws which are coupled to or may be considered parts of said coordinating mechanism (the screw for adjusting the exhaust being only fragmentarily shown in order to disclose certain parts therebeneath.)

Figure 4L is a vertical longitudinal section, to a still larger scale, taken approximately on the line 4L of Figure 3, showing most of the valve gear parts directly associated with the operation of the valves for the left-hand cylinder, including the left-hand yoke which is driven from the left-hand crosshead, the left-hand combining lever mechanism pivotally mounted on said yoke, the left-hand swinging link mechanism, the radius rod mechanism adjustably coupling the combining lever mechanism to the link mechanism, the admission adjusting screw with certain of the gears of the coordinating mechanism, and the means coupling said screw to the admission reversing shaft, which is a hollow shaft surrounding the exhaust reversing shaft. This figure omits, for the sake of clarity, the cross-over connection by which the left-hand yoke is adapted to actuate the right-hand link mechanism and the cross-over connection by which the left link mechanism receives its motion from the right-hand yoke, which is oscillated by the right-hand crosshead. It also omits the take-off connections from the valve gear box to the cam boxes, as these lie in the forwardmost part of the gear box, not shown in this figure.

Figure 4R is a section similar to Figure 4L but taken approximately on the line 4R of Figure 3, to illustrate the major parts of the valve gear directly associated with the operation of the valves for the right-hand cylinder. This view also omits, for the sake of clarity, the cross-over connections; but illustrates the exhaust adjusting screw with associated parts of the coordinating mechanism, and the coupling of said screw to the exhaust reversing shaft which extends transversely of the box and passes centrally through the hollow admission reversing shaft.

Figure 5LR is an irregular, vertical section omitting many of the parts shown in Figures 4L and 4R, but showing the cross-over connection from the left-hand yoke to the right-hand link mechanism.

Figure 5RL is another irregular, vertical section, omitting various parts, but illustrating the cross-over connection from the right-hand yoke to the left-hand link mechanism.

Figure 6 is a transverse section taken about on the line 6—6 of Figure 3 to illustrate the exhaust take-off rockshafts, and the arms by which they are coupled to the exhaust combining levers.

Figure 7 is a similar transverse section taken about on the line 7—7 of Figure 3 to illustrate the mounting of the admission take-off rockshafts, and the arms by which they are coupled to the admission combining levers.

Figure 8 is a transverse section taken about on the line 8—8 of Figure 3 to illustrate the arrangement of the concentric admission and exhaust reversing shafts, but omitting other parts of the mechanism.

Figure 9 is a vertical transverse section, to a larger scale, taken about on the line 9—9 of Figure 3, illustrating the coordinating mechanism of the present invention, showing certain of the gears thereof in elevation and others in section or broken away.

Figure 10 is an irregular vertical section, to a still larger scale, taken about on the line 10—10 of Figure 9, illustrating the coupling for direct connection of the main reversing shaft to the exhaust adjusting screw shaft, and the gear connections from said shaft to the partial or intermittent gear of the coordinating mechanism.

Figure 11 is a similar irregular section, taken about on the line 11—11 of Figure 9, illustrating the gear connection from said intermittent gear to the admission adjusting screw shaft.

Figure 12 is a perspective view of the shroud associated with the gear which is driven by the intermittent gear.

Figure 13 is a detail view fragmentarily illustrating the intermittent gear and its shroud with relation to said driven gear and its shroud, in the position of these parts corresponding to forward mid-gear position of the valve gear.

Figure 14 is a similar detail showing the position of said parts corresponding to an adjustment of the valve gear partially into the forward range.

Figure 15 is a view similar to Figure 4L, but instead of illustrating the parts in mid-gear position, this figure shows them in a position intermediate mid gear and forward full gear.

Figure 18 is a similar diagram, showing the parts at neutral position.

Figure 19 is a similar diagram, showing the parts at reverse mid-gear position.

Figure 20 is a similar diagram showing the parts in full-gear reverse position.

*Description of typical locomotive arrangement*

Figure 16:
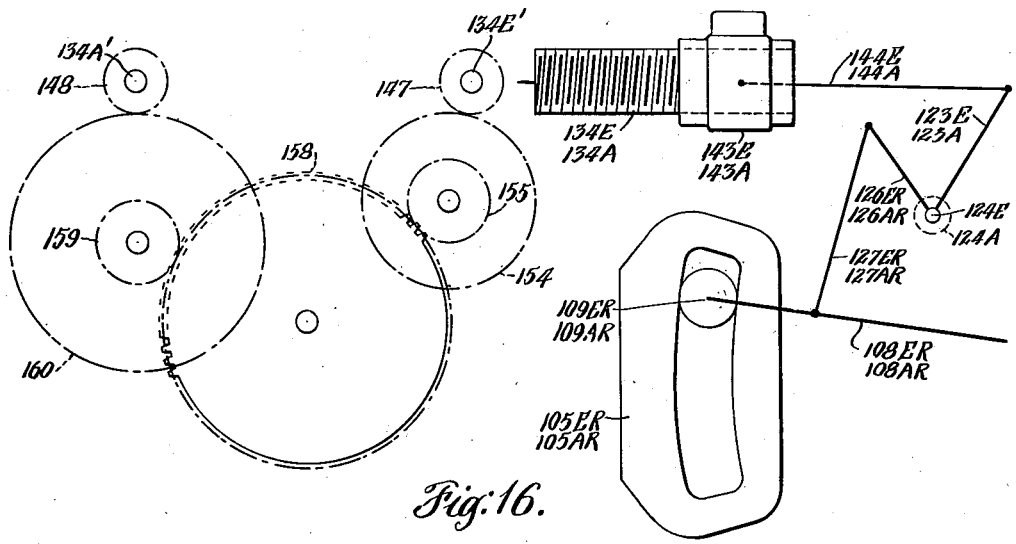
Figure 16 is a line diagram of the arcuate swinging links, radius rods, lifting arms, etc. (both admission and exhaust) for the right side of the locomotive, showing in diagrammatic projection the coordinating mechanism, illustrating the relative positions of the parts in full-gear forward position.

Figures 1B and 1F together illustrate a locomotive (without the tender) which, apart from the valve gear, is of a well known "Pacific" type comprising a boiler 1, firebox 2, smokebox 3, stack 4, main frame 5, front truck including wheels 6, three pairs of main drivers 7, trailing truck including wheels 8, and in the cab 9 an engineman's control member 10 coupled to a main rotatable reversing shaft 12 (conveniently termed main control shaft) which extends forwardly for connection to the valve gear for adjusting and reversing the same. Although the manual control 10 may be a wheel directly mounted on the control shaft 12 in the known manner (or connected thereto through a set of gears as shown in Woodard Patent 2,198,429 of April 23, 1940) I have shown the member 10 as a lever which operates shaft 12 through the medium of a power reverse gear 11. The latter may be of various known types, desirably of a type shown in copending application of Major T. Forker, Jr., Serial No. 352,688, filed August 15, 1940, an embodiment of which has recently been in test operation on Pennsylvania Railroad locomotive No. 5399.

The driving wheels 7 are journaled by means of axles 13 in driving boxes 14 which receive weight from the main frame through the usual springs (not shown) and are vertically slidable within the pedestal jaws 15 in the usual manner. The locomotive shown is of the two-cylinder type, having a cylinder 16 at each side for actuating the pistons RP and LP, which are coupled, respectively, to the right and left cranks RC and LC, by means of piston rods 17, crossheads RS and LS, main rods 18, and side rods 18a; the main rods being pivotally connected to their crossheads at 18'.

The crossheads RS and LS reciprocate in crosshead guides 19, which are rigidly carried by the main frame 5, by means of brackets 19a and a transverse interbracing construction 19b.

It will be noted that in this particular instance the left crank is the leading crank. In other words, in forward motion of the locomotive, the left crank is 90° ahead of the right crank, although in many locomotives the opposite arrangement is employed. Thus, as seen in Figures 1F and 2, when the right crank RC has just passed rearward dead center (with the right-hand piston RP just commencing its forward stroke), the left crank LC has just passed its uppermost position, in the forward half of the cycle (and the left piston LP is at mid-stroke).

The valve gear proper is desirably, but not essentially, housed or enclosed in a box or casing 20, which may conveniently be disposed (as shown in Figures 1F and 2) in a mid-region between the planes of the driving wheels, thus centrally between the longitudinal axes of the two cylinders, said box being herein shown in a position just behind the boiler saddle structure 21, where it may be supported on the main frame members 5 by any suitable rigid support. Such a supporting base is shown at B in Figure 2, the valve gear box 20 having base brackets B' (seen in Figures 6 to 9 and elsewhere) for mounting on said base.

*Connections to the valve gear box*

The actuating connections for driving the valve gear preferably take the form of a right-hand rockshaft RR and a left-hand rockshaft LR, which extend from adjacent the sides of the locomotive inwardly to the mid-region and there connect to parts of the mechanism passing through the side walls of the box 20, suitable disconnectible couplings 22 being provided adjacent said box, the outer ends of said rockshafts being journaled in supporting brackets 23 rigidly secured to the crosshead guide brackets 19a. The connection of the right and left rockshafts RR and LR to the respective crossheads RS and LS may each be constituted by an arm 24 fixed on the end of the rockshaft, and a link 25 pivoted to said arm at 26 and to the crosshead at 27.

The adjusting and reversing connection to the valve motion mechanism in the box 20 from the control 10, 11, in the cab is as follows: the control shaft 12 extends from the cab forwardly along the side of the boiler, as shown in Figures 1B and 1F, and at its forward end it is connected by a universal or other flexible joint 28, and bevel or spiral gears contained within the casing 29, to a shaft 30, which as seen in Figures 1F and 2, extends laterally and downwardly at an oblique angle to a point beneath the boiler. The latter shaft may have universal joints 31 and is connected by bevel or spiral gears within the housing 33 to a longitudinal shaft 35 which is flexibly coupled at 36 to the shaft extension 37 passing through the back face of the box 20. Supporting bracket means 32 are provided.

The actuating connections from the valve gear box to the right and left cam boxes RB and LB are preferably constituted by right-hand admission and exhaust valve actuating rockshafts RA and RE, and corresponding left-hand shafts LA and LE, which connect with parts extending out through the side walls of the box 20, having suitable disconnectible couplings 22, said shafts being journaled in suitable brackets 38 and 39. The admission actuating rockshafts RA and LA fixedly carry arms 40 which extend upwardly and are pivotally connected at 41 to the rear ends of rods 42, the forward ends of which are pivotally coupled at 43 to arms 44 fixed on the admission cam shafts located in the cam boxes RB and LB, for actuating the admission valves. The axis of the admission cam shaft in the cam box RB is indicated at 45 in Figure 1F.

Similarly, the right and left exhaust actuating rockshafts RE and LE fixedly carry arms 46 which are pivoted at 47 to the rear ends of longitudinally extending rods 48, the forward ends of said rods being pivotally coupled at 49 to arms 50 fixed on the exhaust cam shafts (see cam shaft 51 in box RB).

*Cam box mechanism*

The cam box and valve mechanism will be described with reference to Figures 1F and 2, and particularly with reference to the right-hand cylinder (the mechanism being, of course, duplicated for the left-hand cylinder). It will be observed that there is a valve chest 52 at each end of the cylinder, extending upwardly therefrom, and between the two chests is located the cam box RB, said box being secured on top of the cylinder casting.

Admission poppet valves 54 having stems 55 control the admission and cut-off of steam from the main steam pipe 56 through the branch pipes 57 to the respective ends of the cylinder. These valves, as will be observed from Figures 1F and 2, are arranged in pairs at each end of the cylinder, and the valves of each pair are operated in unison, by means of the tappets 65, which project from the cam box RB in registry with the valve stems 55. The tappets 65 are actuated by admission cams 62 (seen in dotted lines in Figure 2), both these cams being fixed on the admission cam shaft 45 (Figure 1F) and oscillated by the arm 44.

Similarly, exhaust poppet valves 58 having stems 59 control release and compression, i. e., the opening and closing of the ports, at the ends of the cylinder, to the exhaust conduits 60, these conduits from the two end chests merging together (as seen in Figure 2) within the saddle casting 21, and the merging exhaust pipes from both cylinders meeting centrally at 61 just below the exhaust nozzle (not shown). As in the case of the admission valves, the exhaust valves are arranged in pairs, there being two such valves in each chest. They are on more widely spaced centers than the inlet valves (as seen in Figure 2) and their stems 59 are located in a plane below the plane of the admission valves and their stems 58. The exhaust valves are operated in parallel, i. e., the valves of each pair are actuated in unison, by means of a pair of exhaust cams 68 which operate through tappets 71 engaging the valve stems 59; the two cams 68 being fixed on the exhaust cam shaft 51 (Figure 1F) which is oscillated by the arm 50.

From the foregoing it is obvious that the admission valves and the exhaust valves are capable of relative movement, i. e. one cam system operates the admission valves and the other cam system the exhaust valves, but at the same time all of the admission valves for one cylinder are operated from one take-off shaft RA, extending out of the gear box 20, and all the exhaust valves for said cylinder are operated from one take-off shaft RE.

This part of the mechanism need not be described in further detail since it is the same as that fully disclosed in the copending Woodard application 256,874 (Patent No. 2,234,613).

*Description of the valve gear proper*

A typical structural arrangement of valve motion mechanism to which the present invention is applicable is illustrated in Figures 3 to 8 inclusive, which will now be referred to. It should be noted that wherever feasible the reference characters designating the parts have the index letter R or L, for the right or left sides of the mechanism, respectively, and the characters A or E for the parts actuating the admission and exhaust valves, respectively. Wherever feasible, the following description will treat in detail only of the parts which operate the valves for one side of the engine (it being understood that most of the parts for the other side are identical) and, as to any particular part or combination of parts, the side chosen for explanation will be either right or left, depending upon which is best illustrated in the drawings.

Referring now to Figure 3, it will be observed that the right and left actuating rockshafts RR and LR, oscillated by the crossheads RS and LS, are connected by couplings 22 each to a trunninon 83R, 83L, of the respective oscillatable yokes 84R, 84L, said trunnions being journaled by any suitable bearings within the bearing housings 85R, and 85L carried by the side walls of the box. Each transmission yoke or lever, 84R, 84L, has a second trunnion 86R and 86L, respectively, journaled in a central bearing 87 which is carried by an upstanding bracket 88 integral with the bottom of the box 20. Each transmission yoke is thus oscillated in synchronism with the crosshead and thus the piston which drives it, and in one sense the yoke may be considered as a part of the actuating connection from the crosshead to the valve gear proper.

*The cross-over connections*

The oscillating yoke 84L has the function of transmitting motion of the left-hand crosshead to the combining lever mechanism for the valves of the left-hand cylinder, and to this end it pivotally carries at 89L an admission combining lever 90AL (see also Figure 15) and an exhaust combining lever 90EL, the other connections to which will be described hereinafter.

The yoke member 84L has the further function of transmitting motion of the left-hand cross-head to the right-hand side of the mechanism, particularly to the swinging link mechanism thereof (as shown in Figures 3 and 5LR), and to this end it has a downwardly extending arm 91L, which has pivotally coupled thereto at 92L one end of a link 93L, the other end of which is pivoted at 94L to an arm 95L fixed on a short transverse hollow rockshaft 96LR, which is fulcrumed on a pin 97' mounted by brackets 97 carried in the bottom of the box. Rockshaft 96LR fixedly carries another arm 98R, which in turn is pivoted at 99R to one end of a link 100R, the other end of which is pivoted at 101R to an arm 102R fixed on and extending downwardly from the bracket 103R of the right-hand link mechanism, which is thus oscillated on its trunnions 104R, in unison with the left-hand crosshead of the locomotive.

Similarly, (as seen in Figures 3 and 4R) the right-hand yoke member 84R has the function of transmitting motion of the right crosshead to the right-hand admission and exhaust combining levers 90AR and 90ER which are pivoted on said yoke at 89R, and it has the further function of actuating the left-hand swinging link mechanism (as seen from Figures 3 and 5RL). Thus the yoke 84R carries a depending arm 91R, which is pivotally coupled at 92R to the forward end of a link 93R, the rear end of which is pivoted at 94R to an upstanding arm 95R fixed upon a short transverse hollow rockshaft 96RL mounted on a fulcrum pin 97''. Said shaft crosses over to the left of the longitudinal central plane of the mechanism and there carries a second fixed arm 98L, which extends downwardly and is pivotally coupled at 99L to the forward end of a link 100L, the other end of which is pivoted at 101L to a downwardly extending arm 102L secured to the mounting bracket 103L of the left-hand link mechanism, whereby said link mechanism is oscillated on its trunnions 104L in unison with the right-hand crosshead of the locomotive engine. The construction and arrangement of the swinging link mechanism itself will be considered later.

*The link mechanism and combining levers*

Referring now to the link-and-radius rod-mechanism for the right side (as seen in Figures 3 and 4R), it will be seen that there are separate admission and exhaust links 105AR and 105ER, mounted in side-by-side alignment in the bracket 103R, being rigidly carried in said bracket as by means of bolts 106R. The bracket, and thus the link mechanism is mounted for oscillation on the axis of trunnions 104R, which are respectively journaled in the side wall of the box and in a central support 88'. The right-hand admission and exhaust links, together with the trunnioned bracket, are shown in top view in Figure 3, but in Figure 4R only the exhaust link appears, since the admission link is directly behind it and is of the same contour. Slidable in these links are admission and exhaust link blocks 107AR and 107ER; the rear ends of the admission and exhaust radius rods 108AR and 108ER being pivoted to the respective link blocks at 109AR and 109ER. The block itself is of the roller type, as shown in dotted lines at 107ER. At their forward ends, the radius rods are respectively coupled to the admission and exhaust combining levers 90AR and 90ER by pivots 110AR and 110ER.

The take-off connections from the combining levers to the admission and exhaust actuating rockshafts RA and RE are shown in Figures 3, 4R, 6 and 7 in the form of rods 111AR and 111ER which at their rear ends are pivoted to said combining levers respectively at 112AR and 112ER, and at their forward ends are pivoted respectively at 113AR and 113ER to arms 114AR and 114ER fixed upon rockshaft members 115AR and 115ER, which latter extend out through the sides of the box and are there connected by couplings 22 to the respective valve actuating rockshafts RA and RE. Suitable anti-friction bearings, the housings of which are indicated at 116 and 116R, are provided for these shafts in a central supporting structure 117, and at the side wall of the box, respectively.

This completes the series of connections from the crossheads, through the oscillating yokes, cross-over connections, admission and exhaust links and radius rods, and admission and exhaust combining levers, to the external rods which couple the valve gear mechanism proper to the admission and exhaust cam shafts in the cam boxes; it being noted that most of the parts just described for the left side are duplicated at the right side.

The reversal and adjustment of the valve gear is accomplished by the mechanism now to be described.

*Mechanism for adjusting admission and exhaust*

By reference to Figures 3, 4L, 4R, 8 and 15 it will be observed that a pair of concentric rockshafts 124A and 124E extend transversely of the box. Internal shaft 124E, which extends all the way across the box and is journaled by bearings 125 in bearing blocks 125' which are removably fixed in the side walls of the box, is the exhaust adjusting and reversing shaft. To this end, it is coupled to the exhaust radius rods 108ER, 108EL by means of lifting arms 126ER, 126EL and lifting links 127ER, 127EL, which latter are coupled to the respective arms by pivots 128ER, 128EL and to the respective radius rods by pivots 129ER, 129EL.

Similarly, the admission adjusting and reversing shaft 124A, which is freely journaled by bronze bushings 130 upon the inner shaft 124E, is coupled to the admission radius rods 108AR, 108AL by means of lifting arms 126AR, 126AL and lifting links 127AR, 127AL, which latter are coupled to the respective arms by pivots 128AR, 128AL and to the respective radius rods by pivots 129AR, 129AL.

For adjusting angular positions of the reversing shafts 124A and 124E, they respectively carry control arms 123A and 123E, the control of which will be described in the following paragraphs. Up to this point, the valve motion mechanism is essentially the same as that disclosed and claimed in the Woodard application 256,874. I will now bring out the major features of the present invention, as applied to or incorporated in the above-described valve gear.

*The coordinating mechanism of the present invention*

This mechanism is shown chiefly in Figures 9–14, although reference may also be made to Figures 3, 4L, 4R and 8.

Within the housing 20, which acts also as a frame for the valve gear, are two sub-frames 133E and 133A, adapted to support, respectively, the exhaust adjusting screw 134E and the admission adjusting screw 134A, and associated parts. These supporting frames are mounted inside the casing 20, by bolts 135 at the side walls, by studs 136 which are carried by bracket 88'' of the central vertical web 88, and by a transverse rod 137 which passes from one side wall of the box to the other. In Figure 3, most of the right-hand sub-frame 133E has been broken away, in order to show the links and other parts therebeneath, but the other frame 133A is shown complete.

The exhaust adjusting screw shaft 134E (as seen in Figures 3, 4R and 10) is journaled at its front end by anti-friction bearing 138E in the upstanding bracket 139E of frame 133E; and at its rear end said screw shaft has a stepped-down shaft extension 134E' which is mounted by means of combined radial-and-thrust ball bearings 140E in a second upstanding bracket 141E. Extending from bracket to bracket is a rod 142E, which serves as a guide for, and to prevent rotation of, the nut or block 143E which is screw-threaded upon the screw 134E. The extreme rear end of screw shaft 134E' carries a hollow shaft extension 37 which (as hereinbefore referred to) forms a part of or is connected by coupling 36 to shaft 35, so that any operation of the engineman's control in the cab is reflected by a direct rotation of the exhaust adjusting screw 134E, which causes an axial travel of the threaded nut or block 143E. The adjusting effect is transmitted from the traveling block to the exhaust reversing shaft 124E, by means of a pair of links 144E pivoted to said block at 145E and pivoted at 146E to the control arm 123E of shaft 124E (see Figure 8).

The admission adjusting screw 134A has the same lead as the exhaust, and is mounted and is coupled up to the admission control arm 123A of shaft 124A in exactly the same manner as just described for the exhaust. This will appear clearly from Figures 3, 4L, 8 and 11, without further description (the admission parts being similarly numbered, except that the suffix "A" is substituted).

The admission screw shaft however is not directly actuated from the cab control, but has its rear extension 134A' coupled to exhaust shafting 134E' by gearing of a special nature, as will now be described.

By reference particularly to Figures 3, 9, 10 and 11, it will be seen that the exhaust screw shaft carries a gear 147 and the admission screw shaft a gear 148, the gears being keyed on their shafts, and that these two gears are interconnected by a train of gears comprising a pair of gears on each of three shafts 149, 150 and 151. These three shafts are removably carried by supporting cups 152 secured in the rear wall of the box 20, and are also supported by an inside transverse web 153.

Gears 154 and 155 are keyed together (as shown) and rotate together about shaft 149, being mounted thereon by needle bearings 156. Gear 154 is in constant mesh with exhaust screw shaft gear 147 and is actuated by it.

On shaft 150 there is mounted, by needle bearings, an integral pair of gears 157, 158, of equal diameter. Gear 157 is continuously toothed around its periphery, and is in constant mesh with gear 155. Gear 158 is discontinuous, i. e., its teeth are missing around part of its periphery, as clearly seen in Figure 9. Within a portion of its angular range of movement this gear is adapted to mesh with gear 159.

Gears 159 and 160 are mounted, by bearings, on shaft 151, and are keyed to turn as a unit. Gear 159, as just mentioned, may be in or out of mesh with gear 158, depending upon the angular position of the latter, whereas gear 160 is in constant mesh with gear 148 on the admission screw shaft.

From Figure 9 it will be seen that gears 147 and 148 are of one size (16 teeth each); gears 155 and 159 are of one size (20 teeth each); and gears 157 and 158 are of one size (normally 71 teeth each, although the partial gear 158 has had 38 teeth removed); but gear 160 (which has 62 teeth) is larger than gear 154 (having 40 teeth). Thus, although there is a gear reduction from gear 147 to gear 157, so that the gear-pair 157, 158, experiences only a fraction of the angular movement of the original driving gear 147, yet there is a greater increase from gear 159 to gear 148. Therefore, although admission gear 148 is turned during only part of the rotation of exhaust gear 147 (due to the omission of part of the teeth of gear 158), when it is turning it turns faster than gear 147.

The effects of this will be set out more fully when the diagrams of Figures 16 to 20 are explained, but it may be briefly stated here that one of the purposes is to secure a more rapid adjustment of the timing of the inlet valves than the adjustment in the timing of the exhaust valves, so as to prevent prohibitively early release and compression when the valve gear is adjusted to very early cut-offs. This difference in speed of adjustment of the timing of admission and exhaust has the result that when the admission adjusting parts reach the mid-point (when moving from either forward full-gear or reverse full-gear) the exhaust adjusting parts are short of reaching the mid-point, and are at a position which may for convenience be termed "forward mid-gear" (or "reverse mid-gear"—as the case may be). Therefore, in passing from the forward adjustment range into the reverse adjustment range, or vice versa, the present arrangement is designed to hold the admission adjustment stationary at its mid-point, while the exhaust adjustment is carried over from "forward mid-gear" position to "reverse mid-gear," or vice versa.

The omission of certain teeth on gear 158 accomplishes this purpose. Further, in order that the admission be positively locked against movement while this intermediate range of exhaust adjustment is being effected, I have provided interengaging shrouds on the partial gear and the gear in mesh therewith.

By reference to Figures 9, 11, and 12 to 14, it will be seen that gear 159 is keyed to a sleeve 161, which (in addition to jointly mounting gears 159 and 160 on their bearings) carries a shroud member 162 which is adapted to engage and ride upon the surface 163 of a second shroud member 164 which is secured by bolts 165 to the partial gear 158.

Since the structural views of Figures 1 to 11 show all the valve gear parts in absolute mid-gear, the angular position of partial gear 158 (as will be noted from Figure 9) is such that the center of its toothless portion, and the center of the shroud surface 163, are respectively adjacent the gear 159 and the center of its shroud 162. In this relationship, the exhaust adjusting screw 134E can be turned in either direction, carrying with it the gears 147, 154, 155, 157 and 158, and the shroud 164, but the surface 163 of the latter which is then in slidable engagement with the surface of shroud 162 will lock the latter the bottom of the link at the same time as the exhaust link block.

Figure 20 shows the parts in the full-gear reverse position, where the admission and exhaust parts are again in alignment.

Summary

In general, it will now be understood how most of the objects and advantages set out at the beginning of this specification are attained. It may, however, be well to emphasize certain points briefly.

By the utilization of low-pitch (in the sense of "low helix angle") screw shafts, the mechanism is made self-locking, or irreversible, as against the transmission back to the power reverse gear or to the engineman's control member of any motions or forces arising in or caused by the valves or the valve gear. By utilizing such a self-locking means as one of the final elements in the series of adjustment connections to each of the admission and exhaust reversing shafts, there is an added safeguard against motions of either the admission or exhaust affecting the other. This also relieves the gear train of valve gear shocks, thus minimizing wear of the gears, and avoiding breakdowns, which is quite an important advantage.

An added locking feature for the admission, while it is dwelling at the neutral point, is provided by the shrouds associated with the partial gear and its mating gear, as hereinbefore described.

The total range of adjustment of the valve gear can be altered by substituting different screw shafts. Thus the coordinated adjusting mechanism of the present invention is readily adaptable to valve gears of different types and sizes, without necessarily re-designing the sizes and proportions of many parts of said adjusting mechanism.

The thread pitch or lead of the complementary screw shafts and adjusting blocks can readily be altered, without departing from the scope of the invention. In the present instance, the arrangement is such as to give a complete travel of adjustment from full-gear forward to full-gear reverse with approximately twelve turns of the screw shafts, and with gears of the ratios hereinbefore mentioned.

The gear ratios may also be readily altered, by changing the size of one or more gears and/or the number of gears employed in the train, and it is also within the purview of the invention to alter the proportion of the toothed and toothless parts of the intermittent gear, as well as the angular location of said parts with reference to the angular positions of the screw shafts. By such changes or adjustments, any desired difference in the admission and exhaust adjustment rates can be secured, with corresponding difference in the timing of the valves; and the location and extent of the ranges of coordinate movements of the admission and exhaust adjusting means may be altered to suit different conditions.

The elements of the coordinating mechanism of the present invention, including the gearing, the screw shafts and traveling adjustment blocks, and various other parts, though they may be located elsewhere on the locomotive, are desirably associated closely with the valve gear, and in the preferred embodiment herein illustrated this mechanism as an entirety is enclosed in the same housing with the valve gear, where it is mounted in strict alignment with all the other parts and is lubricated by the bath of oil in the said housing.

Numerous other advantages will be apparent to those skilled in the art, and various other changes and adjustments may be made without departing from the spirit and scope of the invention.

I claim:

1. For a locomotive engine or the like, having relatively movable admission and exhaust valve means, a valve gear comprising: mechanism for actuating the admission valve means in timed relation to the engine cycle including means for progressive timing adjustment of the admission valve events, mechanism for actuating the exhaust valve means in timed relation to said cycle including means for progressive timing adjustment of the exhaust valve events, and coordinating mechanism coupled to both of said timing adjustment means, movable through a range from full-gear position to neutral position, and incorporating apparatus for effecting adjustment movement of said two means simultaneously at different rates within a portion of said range and for effecting a dwell of one of said means at a predetermined point of said range while continuing the movement of the other of said means.

2. For a locomotive engine or the like, having relatively movable admission and exhaust valve means, a valve gear comprising: mechanism for actuating the admission valve means in timed relation to the engine cycle including means for progressive timing adjustment of the admission valve events, mechanism for actuating the exhaust valve means in timed relation to said cycle including means for progressive timing adjustment of the exhaust valve events, and coordinating mechanism coupled to both of said timing adjustment means, movable through a range from full-gear position to neutral position, and incorporating apparatus for effecting adjustment movement of the admission adjustment means simultaneously with but at a higher rate than the movement of the exhaust adjustment means within a portion of said range and for effecting a dwell of the admission adjustment means at a predetermined point of said range while continuing the movement of the exhaust adjustment means.

3. For a locomotive engine or the like, having relatively movable admission and exhaust valve means, a valve gear comprising: mechanism for actuating the admission valve means in timed relation to the engine cycle including means for progressive timing adjustment of the admission valve events, mechanism for actuating the exhaust valve means in timed relation to said cycle including means for progressive timing adjustment of the exhaust valve events, and coordinating mechanism coupled to both of said timing adjustment means, movable through a range from full-gear position to neutral position, and incorporating apparatus for effecting adjustment movement of the admission adjustment means simultaneously with but at a higher rate than the movement of the exhaust adjustment means within a portion of said range and for effecting a dwell of the admission adjustment means at said neutral position while continuing the movement of the exhaust adjustment means.

4. For a locomotive engine or the like, having relatively movable admission and exhaust valve means, a valve gear comprising: mechanism for actuating the admission valve means in timed and its connected train of gears 159, 160 and 148, and thus lock the admission adjusting screw 134A against rotation such as might otherwise result from vibration or inertia forces. In short, the admission adjustment is locked by the gear shrouds during that range of operation when shroud surface 163 is in contact with shroud 162.

If the valve gear is adjusted (by the control 10 in the cab) from absolute mid-gear forwardly to forward mid-gear position, the partial gear 158 and its shroud 164 will be turned to the position shown in Figure 13. At this point one of the initial teeth $t$ of the partial gear (which tooth, as shown, is of about half normal depth, to facilitate meshing) is just about to engage the gear 159. At this moment, a projection or horn 165 on the shroud 164 has just come into contact with one end of shroud 162, which relieves the teeth of undue shocks.

Further adjustment of the mechanism (into the forward range), commences to turn the gear 159, as shown in Figure 14, and thus the admission adjusting screw. At the same time the shroud 162 turns away from the shroud 164, clearance for this being provided by the recess 166 in the latter. Further rotation of the parts of course brings shroud 162 around again but the shroud 164 is cut back at 167 to a diameter sufficiently small to prevent fouling of the two shrouds during any part of the meshed operation of gears 158 and 159.

The effects of the step-up in gear ratio between the exhaust adjusting screw and the admission adjusting screw can be seen by inspection of Figure 15, which is an irregular longitudinal section taken on the same line as Figure 4L. However, instead of showing the parts at mid gear (as is the case with Figure 4L) Figure 15 shows the parts at an intermediate position of adjustment within the forward range of adjustment. It will be observed that the admission and exhaust link block centers 109AL and 109EL are at appreciably different distances from the end of the link mechanism. The amount of this difference in spacing will be determined by the gear ratio chosen for the coordinating mechanism. The effect upon the admission and exhaust combining levers 90AL and 90EL is also readily apparent in Figure 15, and it will be understood that this effect is carried through to the valves, regardless of the type of valves or of the linkage employed. The result is that the release and compression events (controlled by the exhaust valves) are prevented from occurring too early, when the admission valves are adjusted to effect very early cut-offs.

The foregoing section, in describing the coordinating mechanism, treats the self-locking screw-shafts 134E and 134A as parts of said mechanism, but in another sense they may be considered as elements of the valve-gear proper. Viewed in another way, the entire coordinating mechanism may be deemed as included within the valve gear, taken as a whole.

*Explanation of the diagrammatic views*

The differing adjustments of admission and exhaust, effected by the coordinating mechanism of the present invention, will appear still more clearly from an examination of the diagrams of Figures 16 to 20 inclusive, which illustrate a series of positions of adjustment of one pair of link blocks in their links (in this instance the pair for the right-hand side), showing also the corresponding angular positions of the intermittent gear. In these views, only one link is shown, since the admission and exhaust links are counterparts and are in direct alignment, when seen in side view.

Figure 16 illustrates the parts in full-gear forward position, which by way of example may be designed to give a cut-off at 85% of the piston stroke, and preadmission, release and compression at percentages best suited to such a cut-off. The exact figures for these events need not here be considered, as they are not limitations upon the present invention. Typical examples may, if desired, be found in the copending Woodard application 256,874.

It will be seen in Figure 16 that the admission adjusting block 143A does not appear, since it is directly behind the exhaust adjusting block 143E, both of them being at the extreme forward ends of their adjusting screws 134A, 134E. Likewise, the other admission parts are directly behind the exhaust parts, so that the diagram is a single-line diagram. The diagram also shows the relationship of the gears between the exhaust and admission adjusting screws (the plane of the gearing being swung around to lie in the plane of the drawing).

Figure 17:
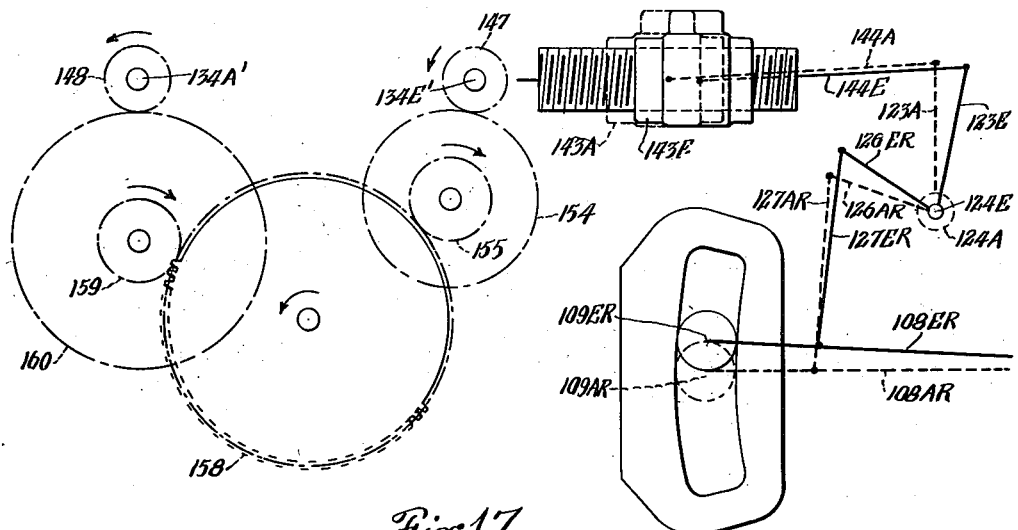
Figure 17 is a similar diagram, showing said parts at forward mid-gear position.

Figure 17 shows the relationship of the admission and exhaust parts, when the several shafts and gears have been turned in the directions indicated by the arrows, until the valve gear has reached forward mid-gear position. This is the position of minimum cut-off, which for example may be 8%, and since the admission link block center 109AR is then at the center of the link, the cut-off will be equal to the preadmission, measured in percentage of the piston stroke. It will be observed that, due to the difference in size between the gears 154 and 160, the exhaust link block center 109ER has not yet reached the center of the link. In other words, through that portion of the range of adjustment represented by the shift from full gear to forward mid-gear, the admission adjustment has traveled faster than the exhaust. The corresponding difference in positions of the adjusting blocks is shown at 143E and 143A. At this time, the partial gear 158 is just coming out of engagement with the gear 159, and the coacting shrouds will prevent unintentional turning of gears 159, 160 and 148.

The admission parts now stand or "dwell" at center, while the exhaust parts continue in their adjustment through the position of Figure 18 to the position of Figure 19.

Figure 18 shows the neutral position, at which the exhaust adjusting block 143E has just come to the center of its screw, so that it is in line with the admission adjusting block, and both link blocks are at the center of the link mechanism, as shown.

Figure 19 shows the parts in reverse mid-gear position, when the exhaust link block 109ER has moved on past the admission link block 109AR, which latter is still at the center of the link. The corresponding positions of the adjusting blocks on their screws are also shown. At this time it will be seen that one of the end teeth of the partial gear 158 has again come around into contact with gear 159. The admission adjustment is then resumed, and at a faster rate than the exhaust, due to the difference in the size of the gears 154 and 160, so that when the engineman's control reaches full-reverse position, the admission link block will have reached relation to the engine cycle including means for progressive timing adjustment of the admission valve events, mechanism for actuating the exhaust valve means in timed relation to said cycle including means for progressive timing adjustment of the exhaust valve events, and coordinating mechanism coupled to both of said timing adjustment means, movable through a range from full-gear position to neutral position, and incorporating apparatus for effecting adjustment movement of said two means simultaneously at different rates within a portion of said range and for effecting a dwell of one of said means at the neutral position while continuing the movement of the other of said means.

5. For a locomotive engine or the like, having relatively movable admission and exhaust valve means, a valve gear comprising: mechanism for actuating the admission valve means in timed relation to the engine cycle including means for progressive timing adjustment of the admission valve events, mechanism for actuating the exhaust valve means in timed relation to said cycle including means for progressive timing adjustment of the exhaust valve events, and coordinating mechanism coupled to both of said timing adjustment means, having a neutral position and being movable through a range from forward full-gear position through the neutral position to reverse full-gear position, and incorporating apparatus for effecting adjustment movement of said two means simultaneously at different rates within portions of said range at opposite sides of the neutral position and for effecting a dwell of one of said means at a point intermediate said portions of the range while continuing the movement of the other of said means through an intermediate portion of the total range, the dwelling means resuming its movement and overtaking the other in making an adjustment in either direction through and beyond said intermediate portion of the total range.

6. For a locomotive engine or the like, having relatively movable admission and exhaust valve means, a valve gear comprising: mechanism for actuating the admission valve means in timed relation to the engine cycle including means for progressive timing adjustment of the admission valve events, mechanism for actuating the exhaust valve means in timed relation to said cycle including means for progressive timing adjustment of the exhaust valve events, and coordinating mechanism coupled to both of said timing adjustment means, having a neutral position and being movable through a range from forward full-gear position through the neutral position to reverse full-gear position, and incorporating apparatus for effecting adjustment movement of the admission adjustment means simultaneously with but at a higher rate than the movement of the exhaust adjustment means within portions of said range and for effecting a dwell of the admission means at a point intermediate said portions of the range while continuing the movement of the exhaust means through an intermediate portion of the total range, the admission means resuming movement and overtaking the exhaust means in making an adjustment in either direction through and beyond said intermediate portion of the total range.

7. For a locomotive engine or the like, having relatively movable admission and exhaust valve means, a valve gear comprising: mechanism for actuating the admission valve means in timed relation to the engine cycle including means for progressive timing adjustment of the admission valve events, mechanism for actuating the exhaust valve means in timed relation to said cycle including means for progressive timing adjustment of the exhaust valve events, separate actuating members for said two timing adjustment means, each movable through a range from full-gear position to neutral position, an engineman's control member, and mechanism controlled thereby for coordinating the operations of said actuating members including apparatus for simultaneously effecting adjustment movements of said two members at rates which are different from each other but each uniformly proportional to movement of said control member throughout one portion of said range and for effecting a dwell of one of said members at a predetermined position while continuing the movement of the other of said members throughout another portion of said range.

8. For a locomotive engine or the like, having relatively movable admission and exhaust valve means, a valve gear comprising: mechanism for actuating the admission valve means in timed relation to the engine cycle including means for progressive timing adjustment of the admission valve events, mechanism for actuating the exhaust valve means in timed relation to said cycle including means for progressive timing adjustment of the exhaust valve events, separate actuating members for said two timing adjustment means, each movable through a range from full-gear position to neutral position, an engineman's control member, and mechanism controlled thereby for coordinating the operations of said actuating members including apparatus adapted to effect adjustment movement of the exhaust actuating member at a rate uniformly proportional to movement of said control member substantially throughout said range, and also adapted to effect adjustment movement of the admission actuating member substantially throughout said range at a rate uniformly proportional to movement of said control member but higher than the rate of adjustment movement of the exhaust actuating member, and further adapted to effect a dwell of the admission actuating member adjacent neutral position while continuing the movement of the exhaust actuating member.

9. For a locomotive engine or the like, having relatively movable admission and exhaust valve means, mechanism for actuating the admission valve means in timed relation to the engine cycle including means for progressive timing adjustment of the admission valve events, mechanism for actuating the exhaust valve means in timed relation to said cycle including means for progressive timing adjustment of the exhaust valve events, an engineman's control member, and mechanism coupling said control member with both of said timing adjustment means incorporating, for each of said means, a pair of cooperating complementary threaded members restraining transmission of motions from both of said timing adjustment means to the control member, and further incorporating means providing for the transmission of a different amplitude of motion from the control member to one of said adjustment means than to the other.

10. For a locomotive engine or the like, having relatively movable admission and exhaust valve means, mechanism for actuating the admission valve means in timed relation to the engine cycle including means for progressive timing adjustment of the admission valve events, mechanism for actuating the exhaust valve means in timed relation to said cycle including means for progressive timing adjustment of the exhaust valve events, an engineman's control member, and mechanism coupling said control member with both of said timing adjustment means incorporating, for each of said means, a pair of cooperating complementary threaded members restraining transmission of motions from both of said timing adjustment means to the control member, and further incorporating means, interposed between the control member and the threaded members, providing for the transmission of different amplitudes of motion to the respective pairs of threaded members.

11. For a locomotive engine or the like, having relatively movable admission and exhaust valve means, mechanism for actuating the admission valve means in timed relation to the engine cycle including means for progressive timing adjustment of the admission valve events, mechanism for actuating the exhaust valve means in timed relation to said cycle including means for progressive timing adjustment of the exhaust valve events, an engineman's control member, and mechanism for connecting the control member with both of said timing adjustment means and for coordinating the operation of both of said means including apparatus providing for transmission of different amplitudes of motion to the respective timing adjustment means with a given adjustment of the control member, and further including substantially irreversible motion transmitting means restraining transmission of motion from one of said timing adjustment means to the other.

12. For a locomotive engine or the like, having relatively movable admission and exhaust valve means, mechanism for actuating the admission valve means in timed relation to the engine cycle and a reversing shaft for reversing and adjusting the timing of the admission valve events, mechanism for actuating the exhaust valve means in timed relation to said cycle and a separately movable reversing shaft for reversing and adjusting the timing of the exhaust valve events, and mechanism for coordinating adjustment movement of the reversing shafts including a mechanical interconnection therebetween providing a different amplitude of motion of the two reversing shafts throughout a portion of the total range of movement thereof, and further including substantially irreversible motion transmitting means positioned to restrain transmission of motion from one reversing shaft to the other.

13. For a locomotive engine or the like, having relatively movable admission and exhaust valve means, mechanism for actuating the admission valve means in timed relation to the engine cycle and a reversing shaft for reversing and adjusting the timing of the admission valve events, mechanism for actuating the exhaust valve means in timed relation to said cycle and a separately movable reversing shaft for reversing and adjusting the timing of the exhaust valve events, and mechanism for coordinating adjustment movement of the reversing shafts including, for each reversing shaft, a pair of cooperating complementary threaded members one of which is connected with the reversing shaft, and means interconnecting the two remaining members of said pairs and providing coordinated actuation thereof at different rates within a portion of the range of adjustment movement.

14. For a locomotive engine or the like, having relatively movable admission and exhaust valve means, mechanism for actuating the admission valve means in timed relation to the engine cycle and a reversing shaft for reversing and adjusting the timing of the admission valve events, mechanism for actuating the exhaust valve means in timed relation to said cycle and a separately movable reversing shaft for reversing and adjusting the timing of the exhaust valve events, and mechanism for coordinating adjustment movement of the reversing shafts including, for each reversing shaft, a pair of cooperating complementary threaded members one of which is connected with the reversing shaft, and gearing interconnecting the two remaining members of said pairs and providing coordinated actuation thereof at different rates within a portion of the range of adjustment movement.

15. For a locomotive having separately movable admission and exhaust valve means, controllable mechanism for altering the timing of the admission valve events including a rotatable shaft, controllable mechanism for altering the timing of the exhaust valve events including a rotatable shaft, and gearing interconnecting said rotatable shafts and providing coordinated rotation of said shafts at different rates throughout a portion of the range of timing adjustment.

16. For a locomotive having separately movable admission and exhaust valve means, controllable mechanism for altering the timing of the admission valve events including a rotatable shaft, controllable mechanism for altering the timing of the exhaust valve events including a rotatable shaft, and gearing interconnecting said rotatable shafts and providing rotation of the timing adjustment shaft for the admission valve means at a higher rate than the shaft for the exhaust valve means throughout a portion of the range of timing adjustment.

17. For a locomotive having separately movable admission and exhaust valve means, controllable mechanism for altering the timing of the admission valve events including a rotatable shaft, controllable mechanism for altering the timing of the exhaust valve events including a rotatable shaft, and gearing interconnecting said rotatable shafts and providing rotation of the timing adjustment shaft for the admission valve means at a higher rate than the shaft for the exhaust valve means throughout a portion of the range of timing adjustment, the gearing incorporating a partial gear providing a dwell of the rotatable admission timing shaft during a portion of the range of adjustment movement of the rotatable exhaust timing shaft.

18. For a locomotive having separately movable admission and exhaust valve means, controllable mechanism for altering the timing of the admission valve events including a rotatable shaft, controllable mechanism for altering the timing of the exhaust valve events including a rotatable shaft, a rotatable element adapted to be controlled by the engineman, and gearing interconnecting said control element and the rotatable shafts and providing coordinated rotation of said shafts at different rates throughout a portion of the range of timing adjustment.

19. For a locomotive having separately movable admission and exhaust valve means, controllable mechanism for altering the timing of the admission valve events including a rotatable shaft, controllable mechanism for altering the timing of the exhaust valve events including a rotatable shaft, a rotatable element adapted to be controlled by the engineman throughout a range of timing adjustment extending from forward full-gear position through a neutral position to reverse full-gear position, and gearing interconnecting the control element and said rotatable shafts and providing rotation of the timing adjustment shaft for the admission valve means at a higher rate than the shaft for the exhaust valve means throughout portions only of the total range of adjustment toward opposite sides of the neutral position and further providing a dwell of the rotatable admission timing shaft intermediate said portions.

20. For a locomotive having separately movable admission and exhaust valve means, controllable mechanism for altering the timing of the admission valve events including a rotatable shaft, controllable mechanism for altering the timing of the exhaust valve events including a rotatable shaft, a rotatable element adapted to be controlled by the engineman throughout a range of timing adjustment extending from forward full-gear position through a neutral position to reverse full-gear position, and gearing interconnecting the control element and said rotatable shafts and providing rotation of the timing adjustment shaft for the admission valve means at a higher rate than the shaft for the exhaust valve means throughout portions only of the total range of adjustment toward opposite sides of the neutral position, the gearing incorporating an intermittent gear providing a dwell of the rotatable admission timing shaft substantially at the neutral position of adjustment of the rotatable member controlled by the engineman.

21. For a locomotive having separately adjustable admission and exhaust valve means, a valve gear having means for adjusting the timing of the admission valve means and means for adjusting the timing of the exhaust valve means, an engineman's control means, coordinating mechanism for operating both adjustment means from said control means, and substantially irreversible connection means adapted to prevent transmission to the control means of motions arising in the valve gear.

22. For a locomotive having separately adjustable admission and exhaust valve means, a valve gear having means for adjusting the timing of the admission valve means and means for adjusting the timing of the exhaust valve means, an engineman's control means, coordinating mechchanism for operating both adjustment means from said control means, and substantially irreversible connection means located between the adjustment means and the coordinating mechanism and adapted to prevent transmission to the control means of motions arising in the valve gear.

23. In a locomotive engine valve gear, having separate adjustment means for altering the timing of admission and exhaust valves respectively, a coordinating mechanism interconnecting said means and comprising a partial gear, a gear adapted to mesh therewith, and shroud means positioned to prevent rotation of one of said gears when said two gears are out of engagement.

24. In a locomotive engine valve gear, having separate adjustment means for altering the timing of admission and exhaust valves respectively, a coordinating mechanism interconnecting said means and comprising a partial gear, a gear adapted to mesh therewith, and shroud means positioned to prevent rotation of one of said gears when said two gears are out of engagement, said partial gear having the end tooth, of a series of teeth, of a reduced height to facilitate meshing.

25. In a locomotive engine valve gear, having separate adjustment means for altering the timing of admission and exhaust valves respectively, a coordinating mechanism interconnecting said means and comprising a partial gear, a gear adapted to mesh therewith, and shroud means positioned to prevent rotation of one of said gears when said two gears are out of engagement, said partial gear having the end tooth, of a series of teeth, of a reduced height to facilitate meshing, and said shroud means having interengaging parts positioned to engage and thereby relieve the teeth of excessive forces upon meshing of said gears.

26. For a locomotive or the like, a valve gear including separate adjustment means for admission and exhaust, an enclosing casing for said valve gear, and a coordinating mechanism adapted to effect predetermined differences in the operation of said two adjustment means, including positively meshing gears, arranged as a compact unit, and journalled and housed within said casing, whereby accuracy of relationship between said gears and adjustment means is assured.

27. For a locomotive engine or the like, having relatively movable admission and exhaust valve means, a valve gear comprising: mechanism for actuating the admission valve means in timed relation to the engine cycle including means for progressive timing adjustment of the admission valve events, mechanism for actuating the exhaust valve means in timed relation to said cycle including means for progressive timing adjustment of the exhaust valve events, and coordinating mechanism coupled to both of said timing adjustment means, movable through a range from full-gear position to neutral position, and incorporating apparatus for effecting adjustment movement of said two means simultaneously within a portion of said range and for effecting a dwell of one of said means at a predetermined point of said range while continuing the movement of the other of said means.

28. For a locomotive engine or the like, having relatively movable admission and exhaust valve means, mechanism for actuating the admission valve means in timed relation to the engine cycle including means for progressive timing adjustment of the admission valve events, mechanism for actuating the exhaust valve means in timed relation to said cycle including means for progressive timing adjustment of the exhaust valve events, a rotatable main reversing shaft adapted to be controlled by the engineman, and operatively coupled to both of said timing adjustment means, and means preventing valve gear motions from affecting the angular setting of said rotatable shaft.

29. For a locomotive engine or the like, having relatively movable admission and exhaust valve means, mechanism for actuating the admission valve means in timed relation to the engine cycle including means for progressive timing adjustment of the admission valve events, mechanism for actuating the exhaust valve means in timed relation to said cycle including means for progressive timing adjustment of the exhaust valve events, a power reverse gear, and mechanism interconnecting the reverse gear with both of said timing adjustment means and incorporating substantially irreversible motion transmitting means positioned to restrain transmission of motion from either of said timing adjustment means to the power reverse gear.

30. For a locomotive engine or the like, having relatively movable admission and exhaust valve means, a valve gear comprising: mechanism for actuating the admission valve means in timed relation to the engine cycle including means for progressive timing adjustment of the admission valve events, mechanism for actuating the exhaust valve means in timed relation to said cycle including means for progressive timing adjustment of the exhaust valve events, an engineman's control member movable through a range from full-gear position to neutral position, and coordinating mechanism coupling said member to both of said timing adjustment means and incorporating apparatus for effecting adjustment movement of said two means simultaneously during movement of said member through a portion of said range and for effecting a dwell of one of said means when said member is at a predetermined point of said range while continuing the movement of the other of said means.

RAYMOND P. DELANO, Jr.